(12) United States Patent
Griessner

(10) Patent No.: US 10,914,751 B2
(45) Date of Patent: Feb. 9, 2021

(54) METHOD FOR DETERMINING AN ANALYTE, AND ANALYSIS SYSTEM

(71) Applicant: BOEHRINGER INGELHEIM VETMEDICA GMBH, Ingelheim am Rhein (DE)

(72) Inventor: Matthias Griessner, Hannover (DE)

(73) Assignee: BOEHRINGER INGELHEIM VETMEDICA GMBH, Ingelheim am Rhein (DE)

( * ) Notice: Subject to any disclaimer, the term of this patent is extended or adjusted under 35 U.S.C. 154(b) by 6 days.

(21) Appl. No.: 16/373,715

(22) Filed: Apr. 3, 2019

(65) Prior Publication Data
US 2019/0310274 A1 Oct. 10, 2019

(30) Foreign Application Priority Data
Apr. 6, 2018 (EP) .................... 18166014

(51) Int. Cl.
*G01N 35/00* (2006.01)
*G01N 35/08* (2006.01)

(52) U.S. Cl.
CPC . *G01N 35/00623* (2013.01); *G01N 35/00693* (2013.01); *G01N 35/08* (2013.01); *G01N 35/00871* (2013.01); *G01N 2035/00633* (2013.01); *G01N 2035/00702* (2013.01)

(58) Field of Classification Search
CPC ............... G01N 35/00623; A61B 1/00057
See application file for complete search history.

(56) References Cited

U.S. PATENT DOCUMENTS

| | | | |
|---|---|---|---|
| 5,096,669 A | 3/1992 | Lauks et al. | |
| 7,887,750 B2 | 2/2011 | Blatt et al. | |
| 7,914,655 B2 | 3/2011 | Frey et al. | |
| 8,110,351 B2* | 2/2012 | Bosnes | G01N 33/54306 435/287.1 |
| 8,950,424 B2 | 2/2015 | Weber et al. | |
| 9,110,044 B2 | 8/2015 | Gumbrecht et al. | |
| 9,222,951 B2 | 12/2015 | Schmitt et al. | |
| 2004/0224416 A1* | 11/2004 | Ghai | G01N 33/96 436/8 |
| 2010/0093559 A1* | 4/2010 | Fan | F16K 99/0049 506/9 |
| 2012/0191362 A1* | 7/2012 | Schmitt | G01N 33/66 702/19 |

OTHER PUBLICATIONS

Allaire et al, Experimental comparison and cross-validation of Affymetrix HT plate and cartridge array gene expression platforms, 2008, Genomics 92, 359-365 (Year: 2008).*
Jung et al., "Point-of-care testing (POCT) diagnostic systems using microfluidic lab-on-chip technologies", Microelectronic Engineering, vol. 132, Oct. 8, 2014, pp. 46-57, XP0555394763, NL.
Wu et al., "Subset Quantile Normalization Using Negative Control Features", Journal of Computational Biology., vol. 17, No. 10, Oct. 2010, pp. 1385-1395, XP055570319, US.
Bolstad et al., "A comparison of normalization methods for high density oligonucleotide array data based on variance and bias", vol. 19, No. 2, Jan. 22, 2003, pp. 185-193, http://bmbolstad.com/misc/normalize/bolstad_norm_paper.pdf, Bioinformatics, Oxford University Press, XP008041261, GB.

* cited by examiner

*Primary Examiner* — Narayan K Bhat
(74) *Attorney, Agent, or Firm* — David S. Safran; Roberts Calderon Safran & Cole, P.C.

(57) ABSTRACT

A sample is measured using a cartridge from a batch comprising a plurality of cartridges of the same type. The measurement results measured in the process are evaluated. In order to evaluate the measurement results, reference results are used in addition, which reference results were measured previously, separately, during measurements of reference samples, using a plurality of cartridges of the same batch. An analyte of the sample is determined from the measurement results. During the evaluation, the reference results and/or measurement results are preferably normalized.

36 Claims, 16 Drawing Sheets

|  | C1 | C2 | C3 | ... | CL |
|---|---|---|---|---|---|
| SF1 | $x_{11}$ | $x_{12}$ | $x_{13}$ | ... | $x_{1L}$ |
| SF2 | $x_{21}$ | $x_{22}$ | $x_{23}$ | ... | $x_{2L}$ |
| SF3 | $x_{31}$ | $x_{32}$ | $x_{33}$ | ... | $x_{3L}$ |
| ... | . | . | . | . | . |
| SFM | $x_{M1}$ | $x_{M2}$ | $x_{M3}$ | ... | $x_{1L}$ |

Fig. 12A $X$

|  | C1 | C2 | C3 | ... | CL |
|---|---|---|---|---|---|
| (A1,SF1) | $x_{11}$ | $x_{12}$ | $x_{13}$ | ... | $x_{1L}$ |
| (A2,SF1) | $x_{21}$ | $x_{22}$ | $x_{23}$ | ... | $x_{2L}$ |
| ⋮ | ⋮ | ⋮ | ⋮ | ⋮ | ⋮ |
| (AN,SF1) | | | | | |
| (A1,SF2) | | | | | |
| ⋮ | | | | | |
| (AN,SF2) | | | | | |
| ⋮ | | | | | |
| (A1,SFM) | | | | | |
| ⋮ | ⋮ | ⋮ | ⋮ | ⋮ | ⋮ |
| (AN,SFM) | $x_{M1}$ | $x_{M2}$ | $x_{M3}$ | ... | $x_{1L}$ |

Fig. 12C

METHOD FOR DETERMINING AN ANALYTE, AND ANALYSIS SYSTEM

BACKGROUND OF THE INVENTION

Field of the Invention

The present invention relates to a method for determining an analyte of a sample, to an analysis system for determining an analyte of a sample, and to a computer program.

The present invention preferably relates to the analysis, test or examination of a preferably biological sample, in particular of a human or animal, particularly preferably for analytics and diagnostics, for example with regard to the presence of diseases and/or pathogens, and/or for determining blood values, antibodies, hormones, steroids or the like. The field of the present invention is therefore in particular that of bioanalytics. It is optionally also possible for an examination or test of a food sample, environmental sample or other sample to be carried out, in particular for environmental analytics or food safety and/or in order to detect other substances.

Preferably, at least one analyte (target analyte) of a sample can be determined, identified or detected by means of the present invention. In particular, when examining or testing the sample, at least one analyte can be determined qualitatively or quantitatively, for example in order to allow the detection or identification of a disease and/or a pathogen.

Analytes within the meaning of the present invention are in particular nucleic acid sequences, in particular DNA sequences and/or RNA sequences, and/or proteins, in particular antigens and/or antibodies. In particular, nucleic acid sequences and/or proteins can be determined, identified or detected, as analytes of the sample, by means of the present invention. The present invention very particularly preferably relates to systems, devices and other apparatuses for performing a nucleic acid assay for detecting or identifying a nucleic acid sequence, and/or a protein assay for detecting or identifying a protein.

The present invention relates in particular to what are known as point-of-care systems, i.e. in particular mobile systems, devices and other apparatuses, and to methods for performing examinations or tests of a sample at the location at which the sample is taken and/or independently or remotely of a central laboratory or the like. Point-of-care systems can preferably be operated autonomously or independently of a public electrical energy supply network.

Description of the Related Art

U.S. Pat. No. 7,887,750 B2 discloses an analysis system for detecting and quantitatively determining multiple analytes, such as a protein or DNA, in a sample. The system comprises a device configured to accept a cartridge which is used for testing the sample. The system identifies the cartridge and determines calibration parameter values (which are not further specified), test procedures and algorithms, and lot information for the cartridge. The algorithms and calibration parameter values are used for converting determined numerical values into analyte concentrations. This document does not disclose any details concerning the calibration.

U.S. Pat. No. 5,096,669 discloses a point-of-care system for examining a biological sample, in particular blood. The system comprises a disposable cartridge and an analysis device. After receiving the sample, the cartridge is inserted into the analysis device in order to perform the examination. The cartridge comprises a microfluidic system and a sensor apparatus comprising electrodes, which sensor apparatus is calibrated by means of a calibration fluid and is subsequently used for examining the sample.

Also, International Patent Application Publication No. WO 2006/125767 A1 and corresponding U.S. Pat. No. 9,110,044 B2 disclose a point-of-care system for integrated and automated DNA or protein analysis comprising a single-use cartridge and an analysis device for fully automatic processing and evaluation of molecular-diagnostic analyses using the disposable cartridge. The cartridge is designed for receiving a sample, in particular blood, and in particular allows for cell disruption, a PCR, and detection of PCR amplification products which are bonded to capture molecules and provided with a labelling enzyme, in order for it to then be possible to detect bonded PCR amplification products or nucleic sequences as target analytes in what is known as a redox cycling process.

In gene expression analysis, what are known as microarrays are often used, which make it possible to measure the expression of up to several thousand genes simultaneously. It is known that the data measured by means of the microarrays first has to be processed in order for it to be possible to compare, and thus use, the data measured using the microarrays. Technical or production-related artefacts or inaccuracies or slight deviations between the individual microarrays lead to the measured data or signals being not directly comparable. Processing data with the aim of making said data (better or more) comparable is referred to as normalization. An aim of the normalization of data is to be able to distinguish technological artefacts in the data from genuine biological causes. Some normalization methods are described in Bolstad et al., "A comparison of normalization methods for high density oligonucleotides array data based on variance and bias", Bioinformatics 19 (2), 2003, pages 185-193.

SUMMARY OF THE INVENTION

An object of the present invention is to make possible a quantitative analysis, in particular with respect to the determination of an analyte, of an unknown sample, by means of a point-of-care system.

The above object is achieved by a method, an analysis system, and a computer as described herein.

In the proposed method, at least one analyte or a plurality of analytes of an unknown sample is/are identified or determined. The sample is preferably a biological sample or a sample of biological material. The sample may, however, be a different sample, for example a chemical sample.

A cartridge is used in order to examine, test or measure the sample. The sample is measured using the cartridge, in order to determine or identify the analyte or analytes.

The measurement results measured while determining the analyte are evaluated, in particular after the measurement or following the measurement.

The cartridge that is used for examining or testing the sample or for determining or identifying the analyte is preferably a cartridge from a batch of a plurality of similar cartridges that were produced in a batch process, in particular together. A batch preferably comprises or consists of at least 100, more preferably at least 1,000, in particular at least 10,000, particularly preferably at least 50,000 cartridges.

Preferably, reference results are used in addition for evaluating the measurement results. Particularly preferably, the reference results were measured previously, i.e., prior to the measurement of the (unknown) sample and/or prior to the sale or the delivery of the cartridge, separately from the measurement of the sample, during measurements of reference samples using a plurality of cartridges of the same cartridge batch. This is conducive to precise and/or quantitative determination of the analyte. In particular, this makes it possible to quickly, reliably and/or quantitatively determine the analyte, in particular also simultaneously and/or a plurality of analytes.

The measured values measured while determining the analyte are preferably normalized, in particular after the measurement or following the measurement or during the evaluation. The measurement results are preferably normalized several times and/or using different reference results. This is conducive to improved comparability of the measurement results and/or quantitative analysis of the sample.

The analyte is preferably determined from the normalized measurement results. This is conducive to precise and/or quantitative determination of the analyte.

It is preferable for the reference results to (also) be normalized, in particular during or for the purpose of the evaluation, or for normalized reference results to be used or consulted for the evaluation. The reference results are preferably normalized separately from the measurement results.

In particular, the normalization of the reference results can also take place prior to measuring the unknown sample and/or immediately following the measurements of the reference samples and/or prior to the evaluation of the measurement results, or independently thereof. In this way, the reference results do not need to be normalized again for each measurement of an unknown sample, but it is possible, instead, for already normalized reference results to be provided for the evaluation of the measurement results. This is conducive to quick analysis and reduced outlay.

A first function is preferably formed on the basis of the reference results. The first function is preferably formed on the basis of normalized reference results. Alternatively, however, the first function can be formed on the basis of non-normalized reference results or without prior normalization of the reference results. The first function preferably represents a relationship between an absolute or relative frequency or concentration of the analyte in the sample, and a measurement result of the analyte that is anticipated therefor or that is representative of or an average for the batch. This is conducive to precise, quick and/or simple determination of the analyte.

A second function is preferably formed on the basis of the measurement results or on the basis of the measurement results and reference results. Alternatively or in addition, the analyte is preferably determined by comparing the measurement results and/or the second function with the first function. In particular, an absolute or relative frequency or concentration of the analyte in the sample is determined from the comparison. This is conducive to precise, quick and/or simple determination of the analyte.

Particularly preferably, a point of intersection of the second function with the first function is determined. Preferably, the analyte is in particular quantitatively determined by means of the point of intersection, and/or the point of intersection, in particular the x-value or abscissa thereof, represents the frequency or concentration of the analyte. In this way, the analyte can be determined simply, quickly and/or precisely.

Preferably, the same analyte is measured in a plurality of sensor fields of a sensor apparatus of the cartridge, independently of one another and preferably simultaneously. In particular separate measurement results are measured thereby. This is conducive to precise and reliable determination of the analyte.

"Separate measurement results" are in particular measurement results that are or were measured in different sensor fields of the sensor apparatus. The term "separate measurement results" preferably denotes measurement results of the same analyte or measurement results that are assigned to the same analyte.

It is preferable for the measurement results of different analytes to be normalized independently of one another, in particular no measurement results or reference results of other analytes being used for normalizing the measurement results of an analyte. In other words, the measurement results of each analyte are preferably normalized taking account only of measurement results and/or reference results of the same analyte.

In another preferred variant, in order to normalize the measurement results of an analyte, measurement results and/or reference results of another analyte are used in addition.

In an embodiment of the method, the separate measurement results (of one or of the same analyte) are combined to form a total value of the analyte, total values of different analytes preferably being normalized independently of one another, in particular no total values of measurement results or reference results of other analytes being used for normalizing the total value of the analyte.

In another embodiment of the method, in order to normalize the total value of the analyte, total values and/or reference results of another analyte are used in addition.

Particularly preferably, the measurement results and/or reference results are normalized by means of quantile normalization. This is conducive to particularly precise and/or simple normalization and/or determination of the analyte.

The analyte (to be determined) is preferably formed by a protein, a nucleic acid or an aptamer.

In the proposed method, the analytes or amplification products of the analytes are preferably bonded to corresponding capture molecules (corresponding to the analyte and/or amplification products) of a sensor apparatus of the cartridge. This is conducive to particularly precise and/or simple determination of the analyte.

It is preferable for the analytes or amplification products that are bonded to the capture molecules to be detected electrically and/or electrochemically and/or by means of electrodes. This is conducive to particularly precise and/or simple determination of the analyte.

According to a further aspect, which can also be implemented independently, the present invention relates to an analysis system for determining at least one or a plurality of analytes of an, in particular biological, unknown sample. The analysis system preferably comprises a cartridge for receiving the sample, and an analysis device for receiving the cartridge and for subsequently determining the analyte using the received cartridge.

The analysis system particularly preferably comprises one or more means that are suitable for carrying out the steps of the method for determining the analyte. Said means are preferably formed by a computer program or evaluation module.

The present invention furthermore relates to a computer having a program comprising commands which cause the analysis system to carry out the method steps.

According to a further aspect, the present invention relates to a computer-readable medium on which the computer program is stored.

Preferably, performing or controlling of the analysis device and/or of the method for determining the analyte is carried out using or by means of an operating instrument, at least in part. The operating instrument is preferably physically separated or separable from the analysis device and/or is formed by a mobile terminal device, in particular a laptop, a smartphone, a tablet or the like.

The operating instrument or the smartphone preferably comprises the computer program and/or the evaluation module, particularly preferably in the form of an app.

In the present invention, the term "cartridge" is preferably understood to mean an in particular mobile device that is designed to receive, to store, to physically, chemically and/or biologically treat, and/or to measure a preferably biological sample. A cartridge within the meaning of the present invention preferably comprises a fluidic system or fluid system having a plurality of channels, cavities and/or valves for controlling the flow through the channels or cavities. In particular, a cartridge within the meaning of the present invention is formed to be at least substantially flat, planar and/or card-like, in particular formed as a fluidic card, and/or said cartridge can be inserted or plugged into an associated analysis device, as a carrier or container for the sample.

In the present invention, the term "normalization" is in to be understood as a method for in particular statistical processing or editing of data and/or measurement results. In particular, normalization of data and/or measurement results is a (mathematical) transformation or scaling of the data and/or measurement results. There is preferably a mathematical relationship $y=T(x)$, having a transformation or normalization function T, between measured or unchanged data/measurement results x and transformed or normalized data/measurement results y.

Normalization preferably provides for improved or easier comparability of data and/or measurement results. Normalization is particularly preferably a transformation or scaling of the measurement results such that different groups of normalized measurement results or different groups of measurement results after normalization have the same average value and/or the same variance. This can be achieved for example by means of quantile normalization, which will be explained later.

In particular, normalization is provided for eliminating or minimizing non-biological variations or influences in measurement results of a biological sample.

"Normalization of measurement results" or "normalization of reference results" is each intended to be understood as a transformation of the results within the meaning above, in which further results, values or data are transformed or taken into account in addition to the reference or measurement results. Therefore, during normalization of the results, not only the mentioned results themselves, respectively, but, in the same step or in the same process, also further results, values or data are transformed or normalized. This may be desirable for example in the case of normalization of the reference results, in which the aim is actually to normalize all the reference results. The normalization of further data may also be a by-product, however, in particular in the case of normalization of the measurement results, in which the primary aim is to render the measurement results comparable with other values and/or to transform said measurement results such that they have a quantitative significance.

The above-mentioned aspects and features of the present invention, and the aspects and features of the present invention that will become apparent from the following description and in principle can be implemented independently of one another, but also in any combination or order.

Other aspects, advantages, features, properties and characteristics of the present invention will become apparent from the following description of preferred embodiments with reference to the accompanying drawings.

BRIEF DESCRIPTION OF THE DRAWINGS

FIG. 11 is a chart that shows quantile normalization of measured values; and

FIGS. 12A-F depict matrices comprising measurement results or total values to be normalized in different embodiments.

DETAILED DESCRIPTION OF THE INVENTION

In the figures, which are merely schematic and sometimes not to scale, the same reference signs are used for the same or similar parts and components, it being possible for corresponding or comparable characteristics, properties and advantages to be achieved even if the description thereof is not repeated.

Figure 1:
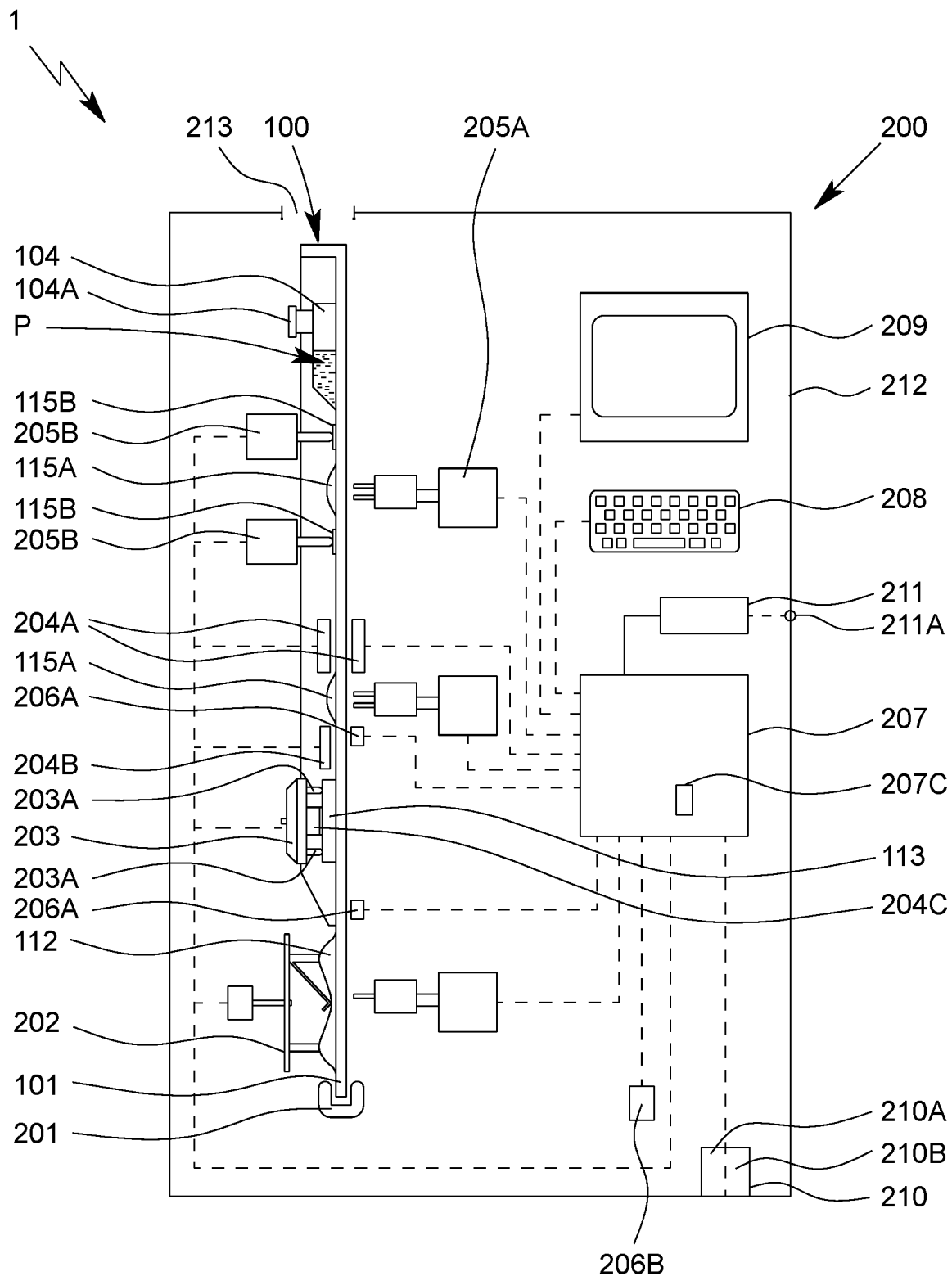
FIG. 1 is a schematic cross section of a proposed analysis system and/or analysis device comprising a proposed cartridge received therein.

FIG. 1 very schematically shows a proposed analysis system 1 or analysis device 200 for examining or testing an in particular biological sample P, preferably by means of or in an apparatus or cartridge 100.

Figure 2:
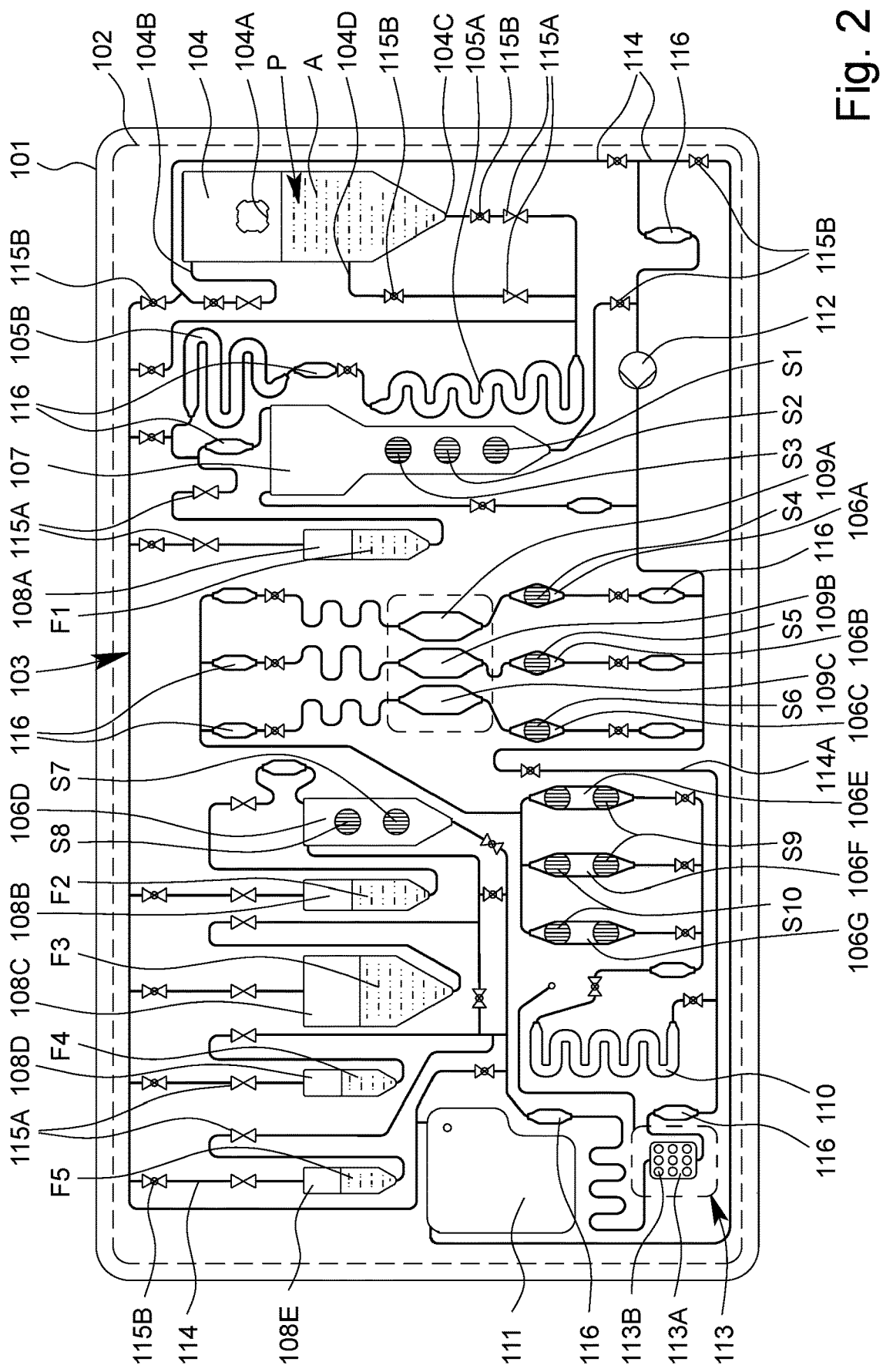
FIG. 2 is a schematic view of the cartridge.

FIG. 2 is a schematic view of a preferred embodiment of the proposed apparatus or cartridge 100 for examining the sample P. The apparatus or cartridge 100 in particular forms a unit that can be handled manually and is referred to in the following simply as a cartridge 100.

The term "sample" is preferably to be understood as the sample material to be tested or examined, which sample material is in particular taken from a human or animal. A sample P within the meaning of the present invention is in particular a fluid, such as saliva, blood, urine or another liquid, preferably of a human or an animal, or a component thereof. A sample P within the meaning of the present invention can be pre-treated or prepared, if necessary, or originate directly for example from a human or an animal or the like. It is optionally also possible for an examination or test of a food sample, environmental sample or another sample to be carried out, in particular for environmental analytics, food safety and/or in order to detect other substances, preferably natural substances, but also biological or chemical warfare agents, poisons or the like.

A sample P within the meaning of the present invention preferably comprises one or more analytes A, the analytes preferably being identifiable or detectable, in particularly qualitatively and/or quantitatively determinable. A sample P within the meaning of the present invention particularly preferably comprises target nucleic acid sequences ZN as analytes A, in particular target DNA sequences and/or target RNA sequences, and/or target proteins ZP as analytes A, in particular target antigens and/or target antibodies. Particularly preferably at least one disease and/or pathogen in the sample P can be detected or identified by means of qualitative and/or quantitative determination of the analytes A.

The analysis system 1 and/or analysis device 200 preferably controls the examination or test of the sample P, in particular in or on the cartridge 100, and/or is used for evaluating the examination/test and/or for collecting, processing and/or storing measured values or measurement results of the examination/test.

An analyte A of the sample P, and/in particular a (certain) nucleic acid sequence or target nucleic acid sequence ZN and/or a (certain) protein or target protein ZP, or particularly preferably a plurality of analytes A of the sample P, can be identified or detected by means of the proposed analysis system 1 or analysis device 200 or the cartridge 100, and/or by means of the proposed method for examining or testing the sample P. The detection and/or measurement in particular takes place not only qualitatively, but instead particularly preferably also quantitatively.

Thus, the sample P can in particular be examined or tested in order to qualitatively or quantitatively determine at least one analyte A, for example, in order to be able to detect a disease and/or a pathogen or determine other values that are important for diagnostics, for example.

Particularly preferably, a molecular-biological examination/test is made possible by means of the analysis system 1 and/or analysis device 200 and/or the cartridge 100.

Particularly preferably, a nucleic acid assay is made possible or carried out for detecting or identifying a target nucleic acid sequence ZN, in particular a target DNA sequence and/or target RNA sequence, and/or a protein assay is made possible or carried out for detecting or identifying a target protein ZP, in particular a target antigen and/or a target antibody.

The term "assay" is preferably understood to mean an in particular molecular-biological examination or test for detecting or identifying at least one analyte A in a sample P. In particular, at least one analyte A in a sample P can be detected qualitatively or quantitatively by means of an assay or by means of performing an assay. In order to (completely) perform an assay, a plurality of method steps are preferably necessary. Preferably, when performing an assay within the meaning of the present invention, a sample P is pre-treated with one or more reagents and the pre-treated sample P is tested or examined, in particular at least one analyte A in the sample P being identified or detected. An assay within the meaning of the present invention is in particular an immunoassay and/or protein assay for detecting a target protein ZP, in particular a target antigen and/or target antibody, and/or a nucleic acid assay for detecting a target nucleic acid sequence ZN, in particular a target DNA sequence and/or target RNA sequence.

Preferably, the sample P or individual components of the sample P or analytes A can, if necessary, be amplified, in particular by means of PCR, and examined, tested or detected, in the analysis system 1 and/or analysis device 200 and/or in the cartridge 100 and/or in order to perform the nucleic acid assay. Preferably, amplification products V of the analyte A or of the analytes A are thus produced or created.

"PCR" stands for polymerase chain reaction, and is a molecular-biological method by means of which certain analytes A, in particular portions of RNA or RNA sequences, or DNA or DNA sequences, of a sample P are amplified, preferably in a plurality of cycles, using polymerases and/or enzymes, in particular in order to subsequently examine, test and/or detect the amplification products or nucleic acid products. In the event that RNA is intended to be examined or amplified, a cDNA is created, starting from the RNA, in particular using reverse transcriptase, before the PCR is performed. The cDNA functions as a template for the subsequent PCR.

In the following, a preferred construction of the cartridge 100 will first be described in greater detail, features of the cartridge 100 preferably also directly being features of the analysis system 1, in particular also without this being further explicitly mentioned.

The cartridge 100 is preferably at least substantially planar, flat and/or plate-shaped and/or card-shaped.

The cartridge 100 preferably comprises an in particular at least substantially planar, flat, plate-shaped and/or card-shaped support or main body 101, the support or main body 101 in particular being made of and/or injection-molded from plastics material, particularly preferably polypropylene.

The cartridge 100 preferably comprises at least one film or cover 102 for covering the main body 101 and/or cavities and/or channels formed therein, at least in part, in particular at the front, and/or for forming valves or the like, as indicated by dashed lines in FIG. 2.

The analysis system 1 or the cartridge 100 or the main body 101 thereof, in particular together with the cover 102, preferably forms or comprises a fluidic system 103, referred to in the following as fluid system 103.

The cartridge 100, the main body 101 and/or the fluid system 103 is oriented preferably at least substantially vertically in the operating or use position and/or during the examination/test, in particular in the analysis device 200, as indicated schematically in FIG. 1.

The cartridge 100, in particular the main body 101, preferably has a main plane of extension, the main plane of extension preferably extending at least substantially vertically and/or in parallel with the force of gravity in the usual operating position and/or in the received state of the cartridge 100.

The cartridge 100 and/or the fluid system 103 preferably comprises a plurality of cavities, in particular at least one receiving cavity 104, at least one metering cavity 105, at least one intermediate cavity 106, at least one mixing cavity 107, at least one storage cavity 108, at least one reaction cavity 109, at least one intermediate temperature-control cavity 110, and/or at least one collection cavity 111, the cavities preferably being fluidically interconnected by means of a plurality of channels.

The cartridge 100 and/or the fluid system 103 furthermore preferably comprises at least one pump apparatus 112 and/or at least one sensor arrangement or sensor apparatus 113.

Some, most or all of the cavities are preferably formed by chambers or channels or other recesses in the cartridge 100 or in the main body 101, and are particularly preferably covered or closed by the film or cover 102. Other structural solutions are also possible, however.

In the example shown, the cartridge 100 or the fluid system 103 preferably comprises two metering cavities 105A and 105B, a plurality of intermediate cavities 106A to 106G, a plurality of storage cavities 108A to 108E, and/or a plurality of reaction cavities 109 that can preferably be loaded independently of one another, in particular a first reaction cavity 109A, a second reaction cavity 109B and an optional third reaction cavity 109C, as can be seen in FIG. 2.

The metering cavities 105 are preferably designed to receive, to temporarily store and/or to meter the sample P, and/or to forward said sample P in a metered manner. Particularly preferably, the metering cavities 105 have a larger diameter than the (adjacent) channels.

In the initial state of the cartridge 100 or when at the factory, the storage cavities 108 are preferably filled at least in part, in particular with a liquid, such as a reagent, solvent or washing buffer.

The collection cavity 111 is preferably designed to receive large quantities of fluids used in particular for the test or examination, such as reagents, sample residues or the like. The collection cavity 111 is preferably empty or filled with gas, in particular air, in the initial state or when at the factory. The volume of the collection cavity 111 preferably corresponds to or exceeds the (cumulative) volume of the storage cavity/cavities 108 or the liquid content thereof, and/or the volume of the receiving cavity 104 or of the received sample P.

The reaction cavity/cavities 109 is/are preferably designed to allow for a reaction of a substance located in the reaction cavity 109, for example, by means of connection or coupling to apparatuses or modules of the analysis device 200, when an assay is performed.

The reaction cavity/cavities 109 is/are used in particular for performing an amplification reaction, in particular PCR, or a plurality of preferably different amplification reactions, in particular PCRs. It is preferable to perform a plurality of preferably different PCRs, i.e., PCRs having different primer combinations or primer pairs, in parallel and/or independently and/or in different reaction cavities 109.

In order to perform the nucleic acid assay, target nucleic acid sequences ZN as analytes A of the sample P are preferably amplified in the reaction cavity/cavities 109 by means of an amplification reaction, in particular in order to create or produce amplification products V for the subsequent detection in the sensor arrangement or sensor apparatus 113.

Within the meaning of the present invention, amplification reactions are in particular molecular biological reactions, in which an analyte A, in particular a target nucleic acid sequence ZN, is copied/amplified, or amplification products V, in particular nucleic acid products, of an analyte A are created/produced. Particularly preferably, PCRs are amplification reactions within the meaning of the present invention.

During a PCR a sample P is preferably first denatured by the supply of heat, in order to separate the strands of the DNA or cDNA. Preferably, primers or nucleotides are then deposited on the separated single strands of DNA or cDNA, and a desired DNA or cDNA sequence is copied using polymerase and/or the missing strand is replaced by means of polymerase. This process is preferably repeated in a plurality of cycles until the DNA or cDNA sequence is present in the desired quantity.

Marker primers, i.e., primers that (additionally) create a marker or a label L, in particular biotin, on the amplified analyte A or amplification products V, are preferably used for the PCR. This allows for or facilitates detection. The primers used are preferably biotinylated and/or comprise or form in particular covalently bonded biotin as the label L.

The amplification products V and/or target nucleic acid sequences ZN and/or other portions of the sample P produced/created in the one or more reaction cavities 109 can be conveyed or fed to the connected sensor arrangement or sensor apparatus 113, in particular by means of the pump apparatus 112.

The sensor arrangement or sensor apparatus 113 is used in particular for detecting, particularly preferably for qualitatively and/or quantitatively determining, the analyte A or the analytes A of the sample P, in this case particularly preferably the target nucleic acid sequences ZN and/or target proteins ZP as analytes A. Alternatively or in addition, however, other values can also be collected or determined.

The sensor arrangement or sensor apparatus 113 is preferably provided with capture molecules M for bonding the analytes A. The sensor arrangement or sensor apparatus 113 is in particular designed for electrochemical detection of analytes A bonded to the capture molecules M.

The sensor arrangement or sensor apparatus 113 preferably comprises (exactly) one sensor array 113A comprising a plurality of sensor fields 113B and/or electrodes 113C, in particular the sensor fields 113B and/or electrodes 113C each being provided with capture molecules M.

Capture molecules M within the meaning of the present invention are in particular nucleic acid sequences, in particular DNA sequences and/or RNA sequences, and/or proteins, in particular antigens and/or antibodies. In particular, the capture molecules M are designed to bond and/or immobilize corresponding analytes A of the sample P.

Capture molecules M within the meaning of the present invention are in particular applied or fixed or immobilized on a sensor array 113A, in particular the sensor fields 113B and/or electrodes 113C of the sensor array 113A, by means of what is known as spotting.

The sensor array 113A, the sensor fields 113B and/or electrodes 113C is/are preferably surface-treated or coated, in particular with thiols, in order to immobilize the capture molecules M, in particular in order to allow the capture molecules M to bond to the electrodes 113C.

The pump apparatus 112 in particular comprises or forms a tube-like or bead-like elevation, in particular by means of the film or cover 102, particularly preferably on the back of the cartridge 100, as shown schematically in FIG. 1.

The cartridge 100, the main body 101, and/or the fluid system 103 preferably comprises a plurality of channels 114 and/or valves 115, as indicated in FIG. 2.

The cavities 104 to 111, the pump apparatus 112 and/or the sensor arrangement or sensor apparatus 113 can be temporarily and/or permanently fluidically interconnected, in particular to form a fluidic circuit, and/or can be fluidically separated from one another, as required and/or optionally or selectively, by means of the channels 114 and/or valves 115, in particular controlled by the analysis system 1 or the analysis device 200.

The cavities 104 to 111 are preferably each fluidically linked or interconnected by means of a plurality of channels 114. Particularly preferably, each cavity is linked or connected by means of at least two associated channels 114, in order to allow for the relevant cavity to be filled, for a flow to pass therethrough, or for said cavity to be emptied, as required.

The fluid transport or the fluid system 103 is preferably not, or not exclusively, based on capillary forces, but instead substantially on the effect of gravity and/or on occurring pumping forces, pressure forces and/or suction forces which are particularly preferably generated by the pump or pump apparatus 112. In this case, the fluid flows or the fluid transport, and the metering, are preferably controlled by accordingly opening and closing of the valves 115 and/or accordingly operating the pump or pump apparatus 112, in particular by means of a pump drive 202 of the analysis device 200.

In the operating position, each of the cavities 104 to 110 preferably comprises an inlet at the top and an outlet at the bottom. It is thus possible to only remove liquid from the relevant cavity, as required, via the outlet.

In particular, the cavities, particularly preferably the storage cavity/cavities 108, the mixing cavity 107 and/or the receiving cavity 104, are each dimensioned and/or oriented in the usual operating/use position such that gas or air bubbles which may potentially arise during filling with the liquid rise upwards in the operating/use position, such that the liquid collects above the outlet without bubbles. However, other solutions are also possible here.

Preferably at least one valve 115 is assigned to each cavity, the pump apparatus 112 and/or the sensor arrangement or sensor apparatus 113, and/or arranged upstream of the respective inlets and/or downstream of the respective outlets.

By means of actuating the assigned valves 115, the cavities 104 to 111 or sequences of cavities 104 to 111 through which fluid flows for example, in series or in succession, can preferably be selectively released or fluid can flow therethrough selectively and/or said cavities can be selectively fluidically connected to the fluid system 103, in particular to a fluidically, preferably closed, circuit of the fluid system 103, or to other cavities.

In particular, the valves 115 are formed by the main body 101 and the film or cover 102, and/or using these and/or in another manner, for example, by means of or using additional layers, recesses or the like.

Particularly preferably, one or more valves 115A are provided, which valves are preferably tightly closed initially or at the factory or in the delivery state, particularly preferably in order to seal the liquids or liquid reagents F located in the storage cavities 108, and/or the fluid system 103, from the open receiving cavity 104 in a storage-stable manner.

An initially closed valve 115A is preferably arranged upstream and downstream of each storage cavity 108. Said valves are preferably opened, in particular automatically, only when the cartridge 100 is actually used and/or when or after the cartridge 100 is (first) inserted into the analysis device 200, and/or in order to perform the assay.

A plurality of, in this case in particular three, valves 115A are preferably assigned to the receiving cavity 104, in particular when an intermediate connection 104D is provided in addition to an inlet 104B and outlet 104C. Depending on the use, then preferably only the valve 115A either at the outlet 104C or at the intermediate outlet 104D is opened in addition to the valve 115A at the inlet 104B.

The valves 115A assigned to the receiving cavity 104 close or seal the fluid system 103 or the cartridge 100 in particular fluidically and/or in a gas-tight manner, preferably until the sample P is introduced and/or the receiving cavity 104 or a connection 104A of the receiving cavity 104 is closed.

Alternatively or in addition to the (initially closed) valves 115A, one or more valves 115B are preferably provided, which valves are not closed in a storage-stable manner and/or are open initially and/or in a rest position, an initial state or when the cartridge 100 is not inserted in the analysis device 200 and/or can be closed by means of actuation. Said valves 115B are used in particular to control the fluid flows during the examination or test.

The cartridge 100 is preferably formed as a microfluidic card or the fluid system 103 is preferably formed as a microfluidic system. In the present invention, the term "microfluidic" should preferably be understood to mean that the respective volumes of individual, a plurality of or all the cavities 104 to 111 and/or channels 114 is, separately or cumulatively, less than 5 ml or 2 ml, particularly preferably less than 1 ml or 800 µl, in particular less than 600 µl or 300 µl, very particularly preferably less than 200 µl or 100 µl.

Particularly preferably, a sample P having a maximum volume of 5 ml, 2 ml or 1 ml can be introduced into the cartridge 100 and/or fluid system 103, in particular the receiving cavity 104.

In order to examine or test the sample P, reagents and liquids are required which are preferably introduced or provided prior to the examination or test, in liquid form, as liquids or liquid reagents F, and/or in dry form, as dry reagents S, as indicated in the schematic drawing according to FIG. 2.

Further, preferably, other liquids F, in particular as washing buffers, solvents for dry reagents S and/or a substrate SU, for example, for forming detector molecules D and/or a redox system, are also required for the examination, test or the detection process and/or for other purposes, and are provided in particular in the cartridge 100, i.e., are likewise introduced prior to use, in particular prior to delivery. In the following, liquid reagents and other liquids are sometimes not distinguished, and therefore the respective explanations are accordingly also mutually applicable.

The analysis system 1 or the cartridge 100 preferably contains all the reagents and liquids required for pre-treating the sample P and/or for performing the examination, test or the assay, in particular for performing one or more amplification reactions or PCRs, such that it is particularly preferably only necessary to receive the optionally pre-treated sample P.

The cartridge 100 or the fluid system 103 preferably comprises an optionally usable bypass 114A in order for it to be possible to conduct or feed the sample P or components thereof past the reaction cavities 109 and/or also directly to the sensor arrangement or sensor apparatus 113, without passing through the optional intermediate temperature-control cavity 110, as required.

Preferably, the bypass 114A is used when performing the protein assay, in particular in order to conduct the sample P or portions thereof directly from the mixing cavity 107 to the sensor arrangement or sensor apparatus 113 and/or past the reaction cavities 109 and/or past the intermediate temperature-control cavity 110.

The cartridge 100, the fluid system 103 and/or the channels 114 preferably comprise(s) sensor portions 116 or other apparatuses for detecting fluid fronts and/or fluid flows.

It is noted that only some of the different components, such as the channels 114, the valves 115, in particular the initially closed valves 115A and the initially open valves 115B, and the sensor portions 116 are labelled in FIG. 2, for reasons of clarity, but that the same symbols are used, in FIG. 2, for each of said components.

The collection cavity 111 is preferably used for receiving excess or used reagents and liquids and sample volumes. Said cavity is preferably filled exclusively with gas, in particular air, in the initial state.

The receiving cavity 104 preferably comprises a connection 104A for introducing the sample P. After the sample P has been introduced into the receiving cavity 104, said cavity or the connection 104A is closed.

The cartridge 100 can then be inserted into and/or received by the proposed analysis device 200, as indicated in FIG. 1, in order to examine or test the sample P. Alternatively, the sample P could also be supplied later.

FIG. 1 shows the analysis system 1 in the state when ready for operation, for performing an examination, a test or an assay using the sample P received in the cartridge 100. In this state, the cartridge 100 is therefore connected to the analysis device 200 or received thereby or inserted therein.

In the following, some features and aspects of the analysis device 200 will first be explained in more detail, in particular with reference to FIG. 1. The features and aspects relating thereto are preferably also directly features and aspects of the proposed analysis system 1, in particular also without this being explicitly mentioned again.

The analysis system 1 or analysis device 200 preferably comprises an in particular slot-like mount or receptacle 201 for mounting or receiving the cartridge 100 in a preferably vertical manner.

The cartridge 100 is preferably fluidically, in particular hydraulically, separated or isolated from the analysis device 200. In particular, the cartridge 100 forms a preferably independent and in particular closed or sealed fluidic or hydraulic system 103 for the sample P and for the reagents and other liquids. As a result, the analysis device 200 does not come into direct contact with the sample P and can in particular also be reused for a further examination or test without prior disinfection or cleaning.

It is provided, however, to mechanically, electrically, thermally and/or pneumatically connect or couple the analysis device 200 to the cartridge 100, in particular on one of the flat faces of the cartridge 100 and/or laterally. In particular, the analysis device 200 acts mechanically, electrically, thermally and/or pneumatically on the cartridge 100, on at least one of the flat faces of the cartridge 100 or laterally, after the cartridge 100 has been received.

The analysis device 200 is preferably designed for activating the pump apparatus 112 and/or valves 115, for acting thermally, and/or for collecting measured data, in particular via the sensor apparatus 113 and/or sensor portions 116.

In addition, the analysis device 200 can preferably be pneumatically connected to the cartridge 100, in particular in order to actuate individual apparatuses, and/or can be electrically connected to the cartridge 100, in particular in order to collect and/or transmit measured values, for example, from the sensor apparatus 113 and/or sensor portions 116.

The analysis system 1 or analysis device 200 preferably comprises a pump drive 202, in particular the pump drive 202 being designed for mechanically activating or actuating the pump apparatus 112.

A head of the pump drive 202 is preferably rotatable in order to actuate or rotatably axially depress the preferably bead-like elevation of the pump apparatus 112. Particularly preferably, the pump drive 202 and the pump apparatus 112 together form a pump, in particular in the form of a hose pump or peristaltic pump and/or metering pump, for the fluid system 103 and/or the cartridge 100.

The pump is particularly preferably designed as described in DE 10 2011 015 184 B4 and corresponding U.S. Pat. No. 8,950,424 B2. Other structural solutions are also possible, however.

The capacity and/or delivery rate of the pump is preferably controllable and/or the delivery direction of the pump or of the pump drive 202 or of fluids in the cartridge 100 is preferably switchable. It is thus preferably possible for the pumping to be carried out selectively forwards or backwards.

The analysis system 1 or analysis device 200 preferably comprises a connection apparatus 203 for in particular electrically and/or thermally connecting the cartridge 100 and/or the sensor arrangement or sensor apparatus 113.

As shown in FIG. 1, the connection apparatus 203 preferably comprises a plurality of electrical contact elements 203A, the cartridge 100, in particular the sensor arrangement or sensor apparatus 113, preferably being electrically connected or connectable to the analysis device 200 by means of the contact elements 203A. The contact elements 203A are preferably contact springs. The contact elements may, however, also be spring-loaded contact pins or the like.

The analysis system 1 or analysis device 200 preferably comprises one or more temperature-control apparatuses 204, in particular heating elements or Peltier elements, for temperature-controlling or thermally acting on the cartridge 100, in particular for heating and/or cooling, the temperature-control apparatus(es) 204 preferably (each) comprising or being formed by a heating resistor or a Peltier element.

Preferably, individual, some or all of the temperature-control apparatuses 204 can be positioned against or abutted on the cartridge 100, the main body 101, the cover 102, the sensor arrangement or sensor apparatus 113 and/or individual cavities, and/or can be thermally coupled thereto and/or can be integrated therein, and/or can be in particular electrically operated or controlled by the analysis device 200. In the example shown, in particular the temperature-control apparatuses 204A, 204B and/or 204C are provided.

The temperature-control apparatus 204A, referred to in the following as the reaction temperature-control apparatus 204A, is preferably assigned to one of the reaction cavities 109 or to a plurality of reaction cavities 109, in particular in order for it to be possible to perform one or more amplification reactions or PCRs therein.

When a cartridge 100 is inserted, the reaction temperature-control apparatus 204A is preferably in contact with the cartridge 100 in the region of the reaction cavity/cavities 109, such that a fluid located therein, in particular the sample P, can be heated and/or cooled.

The temperature-control apparatus 204B, referred to in the following as the intermediate temperature-control apparatus 204B, is preferably assigned to the intermediate temperature-control cavity 110 and/or is designed to (actively) control the temperature of or heat the intermediate temperature-control cavity 110 or a fluid located therein, in particular the analytes A or amplification products V or target nucleic acid sequences ZN.

The intermediate temperature-control cavity 110 and/or the intermediate temperature-control apparatus 204B is preferably arranged upstream of or (immediately) in front of the sensor arrangement or sensor apparatus 113, in particular in order for it to be possible to control the temperature of or to pre-heat, in a desired manner, fluids, to be supplied to the sensor arrangement or sensor apparatus 113, in particular analytes A or amplification products V or target nucleic acid sequences ZN, particularly preferably immediately before said fluids are supplied.

Particularly preferably, the intermediate temperature-control cavity 110 and/or the intermediate temperature-control apparatus 204B is designed or provided to denature the sample P or analyte A or the created amplification products V or target nucleic acid sequences ZN and/or potentially to divide double-stranded analytes A or amplification products V or target nucleic acid sequences ZN into single strands and/or to counteract premature bonding or hybridization of the amplification products V or target nucleic acid sequences ZN, in particular by supplying heat.

The analysis system 1 or analysis device 200 and/or the cartridge 100, and/or one or each temperature-control apparatus 204 preferably comprises a temperature detector or a temperature sensor (not shown), in particular in order to allow for temperature control and/or feedback temperature control.

One or more temperature sensors may for example, be assigned, i.e., thermally coupled, to the sensor portions 116 and/or individual channel portions or cavities.

The temperature-control apparatus 204C, referred to in the following as the sensor temperature-control apparatus 204C, is in particular assigned to the sensor apparatus 113 and/or is designed to (actively) control the temperature of or heat fluids located in or on the sensor arrangement or sensor apparatus 113, in particular analytes A or target proteins ZN or target nucleic acid sequences ZN, in a desired manner, in particular in order to bond and/or (subsequently) separate or denature said substances.

The connection apparatus 203 particularly preferably comprises the sensor temperature-control apparatus 204C and/or the connection apparatus 203 together with the sensor temperature-control apparatus 204C can be connected to, in particular pressed against, the cartridge 100, in particular the sensor arrangement or sensor apparatus 113.

The analysis system 1 or analysis device 200 preferably comprises one or more actuators 205 for actuating the valves 115. Particularly preferably, different (types or groups of) actuators 205A and 205B are provided, which actuators are assigned to the different (types or groups of) valves 115A and 115B for the respective actuation thereof.

The analysis system 1 or analysis device 200 preferably comprises a control apparatus 207, in particular comprising an internal clock or time base, for controlling the sequence of an examination, test or assay, and/or for collecting, evaluating and/or outputting or providing measured values or measurement results 713, in particular from the sensor apparatus 113 or from examination/test results and/or other data or values.

The control apparatus 207 preferably controls or is designed to control actuators of the analysis device 200 in order to act on the cartridge 100 so as to perform the examination or test. The actuators include in particular the pump drive 202, the temperature-control apparatuses 204 and/or valve actuators 205A, B.

The analysis system 1 or analysis device 200 preferably comprises one or more sensors 206. In particular, sensors 206A are assigned to the sensor portions 116 and/or are designed or provided for detecting liquid fronts and/or fluid flows in the fluid system 103.

Particularly preferably, the sensors 206A are designed to measure or detect, in particular in a contactless manner, for example, optically and/or capacitively, a liquid front, fluid flow and/or the presence, speed, mass flow and/or volume flow, the temperature and/or another value of a fluid in a channel and/or a cavity, in particular in a respectively associated sensor portion 116, which is formed in particular by a planar and/or widened channel portion of the fluid system 103.

Alternatively, or in addition, the analysis device 200 preferably comprises (other or further) sensors 206B for detecting the ambient temperature, the internal temperature, the atmospheric humidity, the position, the orientation, for example, by means of a GPS sensor, and/or the alignment or inclination of the analysis device 200 and/or the cartridge 100.

Particularly preferably, the analysis device 200 comprises a sensor 206B for detecting the horizontal and/or vertical orientation of the cartridge 100 or of the analysis device 200, the sensor 206B preferably being designed as a tilt sensor. However, other solutions are also possible here, in particular in which the analysis device 200 comprises a bubble level or spirit level, in order to indicate the horizontal and/or vertical orientation of the cartridge 100 or of the analysis device 200.

The control apparatus 207 preferably controls or feedback controls the pump drive 202, the temperature-control apparatuses 204 and/or actuators 205, in particular taking account of and/or depending on the desired examination or test and/or on measured values from the sensor arrangement or sensor apparatus 113 and/or sensors 206.

The fluid flows are in particular controlled by means of accordingly actuating the pump or pump apparatus 112 and actuating the valves 115.

Particularly preferably, the pump drive 202 comprises a servomotor, stepper motor or a drive calibrated in another manner or a drive having a controllable or feedback controllable rotation rate or number of (partial) rotations, such that a desired metering can be achieved, at least in principle, by means of appropriate actuation.

In addition or alternatively, the sensors 206A are used, in particular in cooperation with the assigned sensor portions 116, for detecting liquid fronts or flows, in order to achieve the desired fluidic flow and/or the desired metering by accordingly controlling the pump or pump apparatus 112 and accordingly controlling the valves 115.

The analysis system 1 or analysis device 200 optionally comprises an input apparatus 208, such as a keyboard, a touchscreen or the like, and/or a display apparatus 209, such as a screen.

The analysis system 1 or analysis device 200 preferably comprises at least one interface 210, for example, for controlling, communicating and/or outputting measured data or examination/test results, and/or for connection to other devices, such as a printer, an external power supply, or the like. The interface may in particular be a wired or wireless interface 210.

The analysis system 1 or analysis device 200 preferably comprises a power supply 211 for providing electrical energy, preferably a battery or an accumulator, which is in particular integrated and/or is externally connected or connectable.

An integrated accumulator is preferably provided as the power supply 211, which accumulator can be (re-)charged by an external charging device (not shown), via a connection 211A, and/or can be replaced.

The analysis system 1 or analysis device 200 preferably comprises a housing 212, preferably all components and/or some or all of the apparatus being integrated in the housing 212. The cartridge 100 can particularly preferably be inserted or slid into the housing 212 or the receptacle 201 and/or received by the analysis device 200 or the receptacle 201, via an in particular closable opening 213, such as a slot or the like.

The analysis system 1 or analysis device 200 is preferably portable or mobile. The weight or mass of the analysis device 200 is preferably less than 25 kg or 20 kg, particularly preferably less than 15 kg or 10 kg, in particular less than 9 kg or 6 kg.

Figure 3:
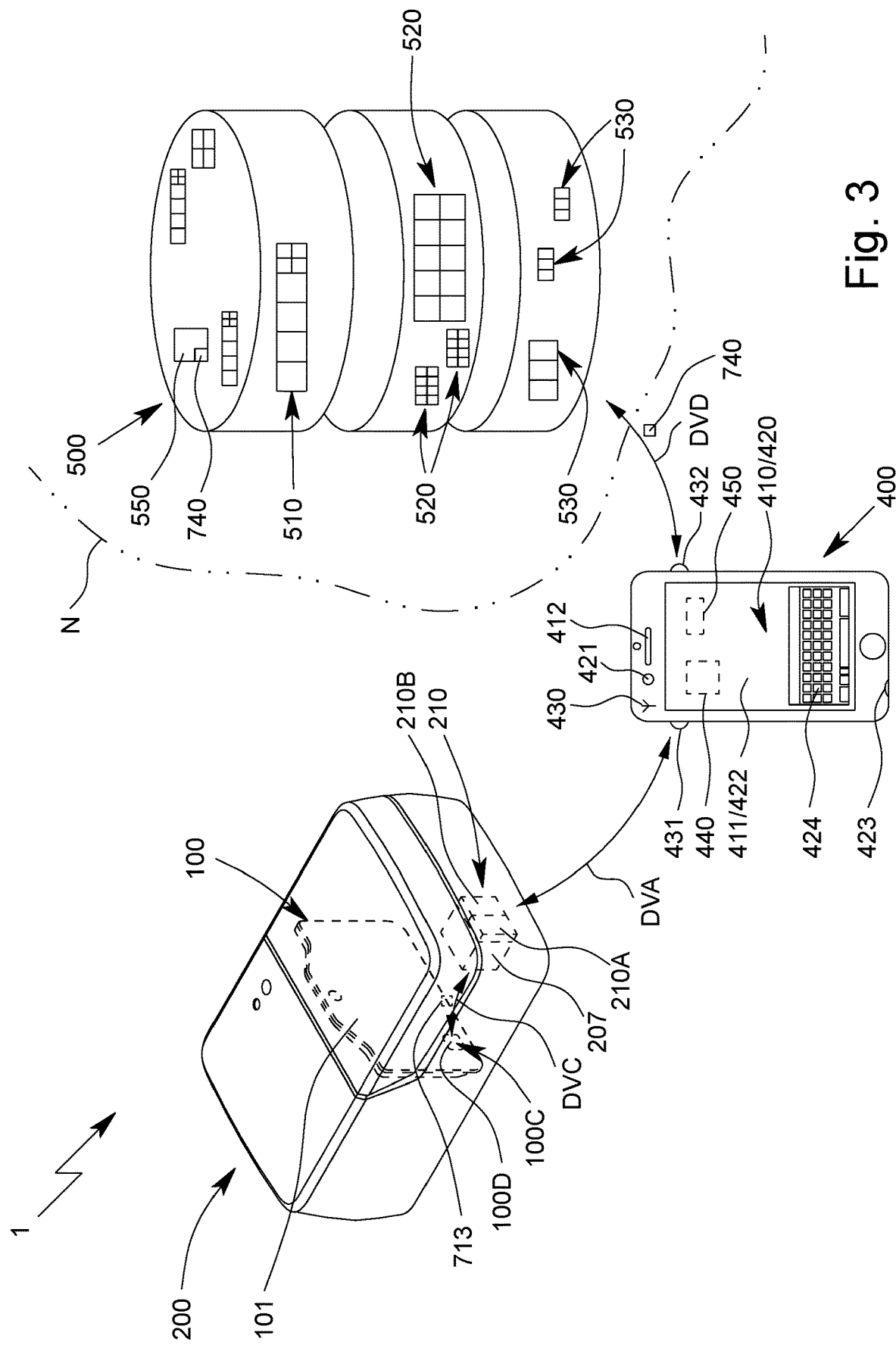
FIG. 3 is a schematic view of the analysis system.

FIG. 3 is a schematic view of the proposed analysis system 1 for examining or testing an in particular biological sample P, comprising the analysis device 200 for receiving the cartridge 100 and subsequently performing the examination or test using the received cartridge 100, and an operating instrument 400 for the analysis device 200.

The operating instrument 400 is preferably designed to control the analysis device 200. Alternatively or in addition, the operating instrument 400 can receive or retrieve information, in particular (measurement) results such as measured values, from the analysis device 200. The operating instrument 400 is in particular a mobile terminal such as a smartphone, a tablet or the like.

The operating instrument 400 is preferably implemented or provided so as to be physically separated from the analysis device 200. The operating instrument 400 can preferably be separated and/or disconnected from the analysis device 200 physically and/or with respect to a data connection.

The operating instrument 400 can preferably be wirelessly connected to the analysis device 200. As a result, it is possible to establish a data connection DVA between the analysis device 200 and the operating instrument 400. In principle, however, the data connection DVA can also be of another kind, for example, wired.

It is preferable for the operating instrument 400 to also be operational when separated or disconnected from the analysis device 200, in particular in order to perform evaluations or for other purposes. Alternatively or in addition, the analysis device 200 can also be operational when separated or disconnected from the operating instrument 400, in particular in order to continue an examination or test.

The operating instrument 400 particularly preferably comprises an interface 430 for establishing data connections DVA, DVD. The interface 430 and/or the operating instrument 400 in particular comprises what referred to as an analysis device interface 431 which is designed for establishing the preferably wireless data connection DVA to the analysis device 200. Said interface may for example, be a radio interface, WPAN interface, Bluetooth interface or a Bluetooth module, or the like.

The interface 210 of the analysis device 200 preferably corresponds to the interface 430 and/or analysis device interface 431 of the operating instrument 400, in particular such that it is possible to establish the data connection DVA between the operating instrument 400 and the analysis device 200. The interface 210 of the analysis device 200 and the analysis device interface 431 preferably support the same data transmission methods or radio transmission methods or radio standards, in particular WLAN or WPAN methods such as Bluetooth, NFC, Zigbee or the like.

The analysis device 200 preferably comprises a receiver 210A for preferably wirelessly receiving the control information 510 from the operating instrument 400. The interface 210 preferably comprises the receiver 210A, via which signals, in particular control information 510, are or can be received from the operating instrument 400.

Alternatively or in addition, the analysis device 200 and/or the interface 210 comprises a transmitter 210B, via which data, in particular results such as measurement results 713 from the sensor apparatus 113, are or can be transmitted, particularly preferably to the operating instrument 400.

The interfaces 210, 431 preferably correspond to one another such that they support the same data transmission standard and/or radio standard, in particular Bluetooth, WLAN or the like. The interfaces 210, 431 are particularly preferably interfaces that allow for what is known as ad-hoc connection, the data connection DVA being established preferably automatically when the devices, i.e., the operating instrument 400 and the analysis device 200, are within range of one another.

The analysis system 1 preferably furthermore comprises a database 500, or the database 500 is assigned to the analysis system 1. The database 500 is preferably an external database 500 that is implemented or provided so as to be physically separated from the operating instrument 400 and/or from the analysis device 200. In principle, however, it is not impossible for the database 500 to be able to be directly connected, in particular to the operating instrument 400, or to be realized or implemented by the operating instrument 400.

The operating instrument 400 can access the database 500 via a data connection DVD. For this purpose, the operating instrument 400 and/or the interface 430 may comprise a database interface 432 by means of which the database 500 can be accessed, in particular via a network N. The network N may be the Internet or another data network. It is furthermore preferable for the operating instrument 400 to be able to establish the data connection DVD to the database 500 via a wireless interface, in particular WLAN, WPAN, mobile communications, or the like. However, other solutions in principle are also possible here.

Particularly preferably, the operating instrument 400 comprises different interfaces 430 which are independent of one another for establishing data connection DVA, DVD to the analysis device 200 and to the database 500, the analysis device 200 (as a peripheral device of the operating instrument 400) being designed to communicate exclusively with or via the operating instrument 400.

The analysis system 1, in particular the database 500, preferably comprises control information 510 by means of which the analysis device 200 can be controlled in order to perform an examination or test.

The control information 510 preferably defines the actuation of the actuators of the analysis device 200 in a specified manner, such that an examination or test of the sample P in the cartridge 100 takes place. In particular, in order to perform the examination or test, actuators can be or are controlled with the control information 510 so as to act on the cartridge 100 or the sample P. Said actuators are in particular the pump drive 202 and/or one or more temperature-control apparatuses 204 and/or one or more valve actuators 205. The control information 510 preferably comprises parameters and/or instructions for performing one or more steps of the method explained above for examining or testing the sample P.

The analysis system 1 preferably comprises calibration information 520 which can be stored in the database 500 and/or can be retrieved from the database 500. The calibration information 520 is preferably suitable for influencing the examination or test of the sample P, in particular in a manner dependent on the specific cartridge 100, a cartridge batch of the specific cartridge 100, and/or the specific examination/test.

The calibration information 520 is in particular basic or default settings, parameters and/or threshold values for sensors such as the sensor apparatus 113 of the cartridge 100, for one or more of the sensors 206A, 200B of the analysis device 200 and/or for one or more of the actuators.

Calibration information 520 can be used, in addition to control information 510, for performing the examination or test, the calibration information 520 preferably influencing or specifying the control information 510. The calibration information 520 can be or can form part of the control information 510, even if this is not explicitly mentioned in the following.

The analysis device 200 can be calibrated and/or configured by means of calibration information 520 that can form part of the control information 510 or can be provided separately. For this purpose, the calibration information 520 can be determined, retrieved and/or transmitted to the analysis device 200 by means of the operating instrument 400.

The proposed analysis system 1 preferably comprises evaluation information 530 which can be stored in the database 500 and/or is retrievable or can be retrieved from the database 500. The evaluation information 530 is preferably designed to be able to interpret measurement results 713 which originate from the cartridge 100, in particular the sensor apparatus 113.

The control information 510 and/or the evaluation information 530 particularly preferably comprises instructions, preferably in the form of an algorithm and/or for controlling a process on or using a processor or controller. The instructions preferably form a module that can be or is implemented by the analysis device 200 and/or the operating instrument 400, as a result of which the behavior of the analysis device 200 and/or of the operating instrument 400 is or can be changed or modified.

The instructions are in particular commands, machine code, pre-compiled source code, or source code. The instructions preferably form a module-like software component, in particular a plug-in. The instructions can be designed to form and/or to replace a module of the operating instrument 400 and/or of the analysis device 200. For this purpose, the control information 510 and/or the evaluation information 530 can comprise a (software) interface for coupling or implementation by means of the control apparatus 207 and/or an evaluation module 440 of the operating instrument 400.

The control information 510 particularly preferably comprises or forms a module of the control apparatus 207 that is exchangeable, preferably in terms of software. Said module preferably contains instructions such as logic commands, loops and the like for controlling the test or examination, in particular in the form of a computer program or computer program product to be executed by the analysis device 200 and/or the control apparatus 207. The control information 510 may, in particular as a plug-in, be or form an exchangeable part of the control apparatus 207.

An evaluation module 440 is preferably formed by the operating instrument 400, or the operating instrument 400 comprises the evaluation module 440. Measurement results 713 read out from the sensor apparatus 113 are evaluated by the evaluation module 440, preferably using the evaluation information 530 retrieved from the database 500, and/or the evaluation module 440 is designed for this purpose.

The evaluation information 530 particularly preferably comprises or forms a module of the evaluation apparatus 440 that is exchangeable, preferably in terms of software. Said module preferably contains instructions such as logic commands, loops and the like for controlling the evaluation of measurement results 713, in particular in the form of a computer program or computer program product to be executed by the operating instrument 400 and/or the evaluation module 440. The evaluation information 530 may, in particular as a plug-in, be or form an exchangeable part of the evaluation module 440.

The database 500 preferably comprises a results memory 550 in which results can be stored or saved.

Within the meaning of the present invention, the term "database" is preferably intended to be understood broadly and in particular also comprises multi-part databases. The database 500 can thus in principle be provided in the form of different physical units or at different locations and/or can be composed of a plurality of sub-databases.

In order to control the examination/test or the analysis device 200, the operating instrument 400 can retrieve control information 510 from the database 500 and transmit said information to the analysis device 200 either in an unmodified or in a modified form.

The operating instrument 400 is preferably designed for evaluating the measurement results 713 which can preferably be generated by the sensor apparatus 113 of the cartridge 100 during the examination or testing of the sample P. For this purpose, it is provided that the measurement results 713, which can originate from a sensor apparatus 113 of the cartridge 100 and/or which can be transmitted from the analysis device 200 to the operating instrument 400, are or can be evaluated in the operating instrument 400. For this purpose, the operating instrument 400 can retrieve or receive the evaluation information 530 from the database 500 and evaluate the measurement results 713 using said evaluation information 530, in particular in the evaluation module 440 of the operating instrument 400.

The operating instrument 400 preferably comprises a memory 450. The memory 450 can be used for at least temporarily storing control information 510, calibration information 520 and/or evaluation information 530, or the operating instrument 400 and the memory 450 may be designed for this purpose. Alternatively, or in addition, evaluation results 740 may be stored in the memory 450, which evaluation results have been or can be generated from the measurement results 713 by means of the operating instrument 400.

In an example, the operating instrument 400 comprises an output apparatus 410, preferably an in particular touch-sensitive screen or display 411 and/or a speaker 412. Alternatively, or in addition, the operating instrument 400 comprises an input apparatus 420, in particular a camera 421, a touchpad 422, a microphone 423 and/or a keyboard 424.

The operating instrument 400 is preferably designed to display an operating interface or a user interface via the output apparatus 410, in particular the screen or display 411, or to provide, in another manner, operating elements for controlling the examination/testing or the analysis device 200 or for outputting a status or other information relating to the examination/test. Alternatively, or in addition, commands can be received via the input apparatus 420, as a result of which the operating instrument 400 starts, configures and/or controls the examination or test of the sample P in a manner corresponding to the commands.

The transmission of commands and/or information to the analysis device 200 is preferably triggered via the input apparatus 420 or can be triggered using the input apparatus 420.

The analysis system 1 may comprise one or more cartridges 100 which can each preferably be distinguished from one another by means of a cartridge identifier 100C. The cartridge identifiers 100C are preferably assigned to the respective cartridges 100. In particular, the cartridge identifier 100C is formed by the cartridge 100, connected thereto and/or arranged thereon.

The cartridge 100 preferably comprises at least one cartridge identifier 100C which corresponds to the cartridge 100 and/or to a lot or batch CH to which the cartridge 100 belongs.

The cartridge identifier 100C is in particular a piece of information that is specific to the respective cartridge 100, in particular is unique or designed for unique identification of the cartridge 100, such as an identification code, which is assigned to the respective cartridge 100 and allows for preferably unique identification thereof.

Alternatively, or in addition, the cartridge identifier 100C allows for the cartridge 100 to be assigned to a production cycle and/or a lot or batch CH of specific cartridges 100. A lot or batch CH is preferably wherein the cartridges 100 are produced in the same, continuous production cycle and/or comprising the same components, in particular the same sensor apparatuses 113 and/or the same reagents and the like. There are preferably a plurality of batches CH which may differ for example, with respect to production periods, batches of starting materials used, and the like.

The cartridge identifier 100C may be stored or saved in a memory means 100D of the cartridge 100. The memory means 100D may be a barcode 124, an NFC tag and/or a memory provided in the sensor apparatus 113, connected to the sensor apparatus 113 or assigned to the sensor apparatus 113, or another apparatus for storing code or the like.

The analysis system 1 may comprise a plurality of cartridges 100 which can each preferably be distinguished from one another and/or assigned to a batch CH by means of at least one cartridge identifier 100C.

The cartridge 100 may also comprise at least two cartridge identifiers 100C which each correspond to the cartridge 100. The cartridge identifiers 100C can preferably be read out by means of different read-out methods, in particular optically, by radio, by a wired connection, or the like.

The respective cartridges 100 may comprise two different memory means 100D having the same or mutually corresponding cartridge identifiers 100C. The memory means 100D are preferably independent of one another and/or physically separated from one another. The memory means 100D can preferably be read out in different manners, in particular electronically or by means of an electronic connection, on the one hand, and wirelessly, in particular optically and/or by radio, on the other hand.

The at least two cartridge identifiers 100C may be the same or may also be different. It is in particular possible and preferable for a (first) cartridge identifier 100C to be individual or unique for the cartridge 100, i.e., to be designed to uniquely identify the cartridge 100. A (other or second) cartridge identifier 100C is preferably designed to assign the cartridge 100 to a batch CH of cartridges 100. The at least two cartridge identifiers 100C preferably correspond to one another. In particular, the cartridge identifier 100C corresponding to the batch CH, and/or the batch CH, can be identified by means of the cartridge identifier 100C that uniquely identifies the cartridge 100. Preferably both cartridge identifiers 100C are read out and used, in particular to determine or retrieve control information 510 and/or evaluation information 530, on the one hand, and to verify said information, on the other hand.

The respective cartridges 100 are preferably identified at least twice or a cartridge identifier 100C is read out and used at least twice, namely preferably once directly by the operating instrument 400 for the purpose of retrieving control information 510 and/or calibration information 520 and/or evaluation information 530, and a second time by means of or via the analysis device 200, in order to ensure that the examination or test is performed using control information 510, calibration information 520 and/or evaluation information 530 that corresponds to the cartridge 100, and/or to verify that the control information 510, calibration information 520 and/or evaluation information 530 corresponds to the cartridge 100.

Figure 4:
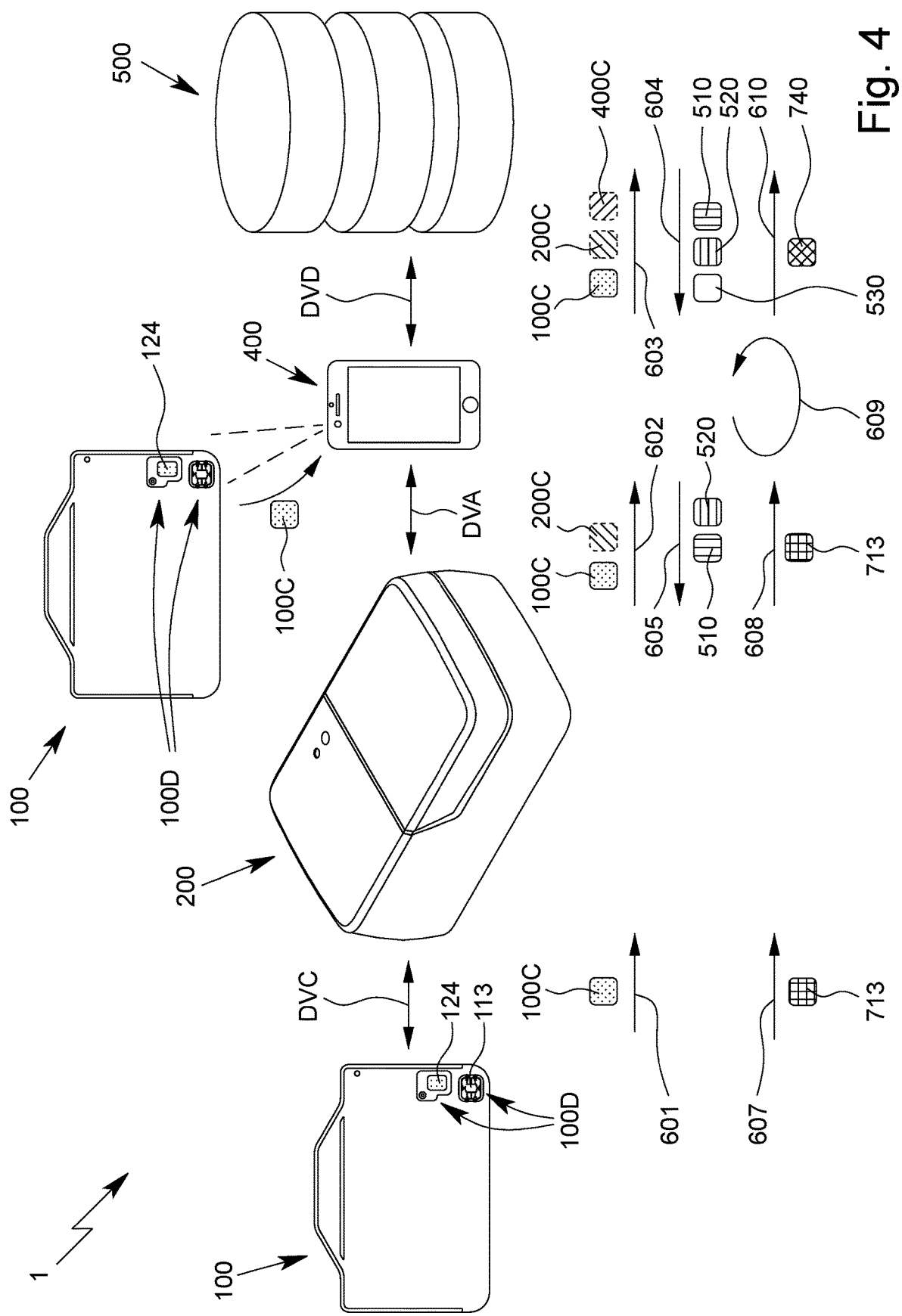
FIG. 4 schematically shows a procedure using the analysis system.

FIG. 4 shows a sequence of a preferred method for examination/testing and/or evaluation, using the proposed analysis system 1, in particular in a manner dependent on the individual cartridge 100. The following aspects and/or method steps can also be implemented and may be advantageous individually or in different combinations, the order as described being preferred but not compulsory, and it being possible for steps to be omitted or added or implemented independently.

The cartridge 100, in particular the sensor apparatus 113, is preferably electrically contacted by the analysis device 200. This is preferably achieved by means of one or more contact elements 203A, as shown by way of example in FIG. 1.

If the cartridge identifier 100C is stored in or assigned to the sensor apparatus 113, said identifier can be read out by the analysis device 200 via a data connection DVC between the cartridge 100 and the analysis device 200, which may be established by means of the contact elements 203A. This is symbolized by the arrow 601 which represents the data transmission from the cartridge 100 to the analysis device 200. The cartridge identifier 100C stored in the sensor apparatus 113 and/or assigned to the sensor apparatus 113 preferably identifies the cartridge 100 uniquely or in a one-to-one manner.

The cartridge identifier 100C read out from the cartridge 100 by the analysis device 200 can be transmitted to the operating instrument 400 via the data connection DVA between the analysis device 200 and the operating instrument 400, as indicated by the arrow 602 in FIG. 4, which arrow represents the data transmission between the analysis device 200 and the operating instrument 400. Optionally, in addition to the cartridge identifier 100C, a device identifier 200C can be transmitted from the analysis device 200 to the operating instrument 400. The device identifier 200C preferably corresponds to the specific analysis device 200 and/or allows for the identification thereof.

The cartridge identifier 100C is particularly preferably transmitted to the operating instrument 400 either directly by reading out the storage means 100D of the cartridge 100 using the operating instrument 400, or indirectly by means of corresponding data transfer via the analysis device 200, and the operating instrument 400 thereby receives or determines the cartridge identifier 100C.

Preferably, the operating instrument 400 receives or determines preferably cartridge-specific or cartridge batch-specific information by means of the cartridge identifier 100C, or the operating instrument 400 is designed for this purpose.

By or after reading out the cartridge identifier 100C of the cartridge 100, the operating instrument 400 preferably automatically retrieves the control information 510 for controlling the analysis device 200 for performing the examination or test supported by the cartridge 100, and/or analysis information 530 for evaluating measurement results 713 determined by the examination or test, or said operating device is designed for this purpose.

In particular, it is provided that the operating instrument 400 receives or retrieves control information 510 on the basis of the cartridge identifier 100C, which information is specific for the cartridge 100, the batch CH thereof, and/or for performing the examination or test using the cartridge 100. The control information 510 is particularly preferably retrieved from the database 500 or can be retrieved from the database 500.

The cartridge identifier 100C is preferably transmitted to the database 500, as indicated in FIG. 4 by the arrow 603, which corresponds to the data transmission from the operating instrument 400 to the database 500.

The database 500 can return control information 510 corresponding to the cartridge 100 or to the cartridge identifier 100C, i.e., transmit said information to the operating instrument 400, as indicated in FIG. 4 by the arrow 604, which represents the data transmission between the database 500 and the operating instrument 400.

Alternatively, or in addition, calibration information 520 and/or evaluation information 530 can also be transmitted to the operating instrument 400 in a corresponding manner from the database 500 to the operating instrument 400, or can be retrieved or is retrievable from the database 500 by the operating instrument 400.

In a variant, the selection or retrieval additionally takes place by using and/or transmitting a device identifier 200C for identifying the analysis device 200, and/or an operating instrument identifier 400C for identifying the operating instrument 400. In this way, the control information 510, calibration information 520 and/or evaluation information 530 can be specific for or compatible with the analysis device 200 and/or with the operating instrument 400, and/or can be selected, transmitted, retrieved and/or returned.

Preferably, control information 510 is retrieved or determined which corresponds both to the cartridge 100 and to the analysis device 200, particularly preferably to the combination of the cartridge 100 and the analysis device 200. As a result, the examination or test can be performed in both a cartridge-specific and analysis device-specific manner, which contributes to good reproducibility and reliability of examinations/test.

Preferably, firstly the cartridge identifier 100C that preferably corresponds only to the batch CH to which the cartridge 100 belongs, is determined by the operating instrument 400, in particular said identifier is or can be read-out from the cartridge 100 directly by the operating instrument 400.

The control information 510 and/or evaluation information 530 is retrieved, in particular by the operating instrument 400, using the cartridge identifier 100C. The retrieved control information 510 and/or evaluation information 530 is preferably temporarily stored in the operating instrument 400.

The operating instrument 400 preferably transmits the control information 510 to the analysis device 200, or the operating instrument 400 is designed for this purpose. This is indicated in FIG. 4 by the arrow 605, which corresponds to data transmission from the operating instrument 400 to the analysis device 200.

Optionally, calibration information 520 can furthermore be transmitted from the operating instrument 400 to the analysis device 200. Alternatively or in addition, the operating instrument 400 may modify the control information 510, in particular taking account of the calibration information 520. The control information 510 may, however, already comprise or take account of the calibration information 520. It is therefore not compulsory to transmit the calibration information 520 to the analysis device 200.

The control information 510 can be received by the analysis device 200 and used for controlling the examination or test. Alternatively or in addition, the verification of the control information 510 can also be carried out in the analysis device 200.

Following transmission of the control information 510, the examination or test is started, preferably in a manner controlled by the operating instrument 400.

Particularly preferably, the examination or test is performed independently of and/or separately from the operating instrument 400. For this purpose, the analysis device 200 is preferably designed to perform or continue the examination/test, using the transmitted control information 510, independently of and/or separately and/or disconnected from the operating instrument 400 or when the data connection DVA is disconnected or broken or terminated.

The analysis device 200, in particular the control apparatus 207, preferably comprises a read-out module 207C for reading out measurement results 713 from the sensor apparatus 113. The read-out module 207C may be designed to digitize measurement results 713 determined in the sensor apparatus 113 and to store and/or transmit said results in the form of a code or a dataset. The read-out module 207C may also be located in the cartridge 100 or in the sensor apparatus 113 in part, at least insofar as the digitization of the measurement results 713 is concerned, and/or the read-out module 207C can read out measurement results 713 digitized by the sensor apparatus 113.

A preferred design of the sensor arrangement or sensor apparatus 113 will be described in greater detail in the following, with reference to FIG. 5 to FIG. 8.

The sensor apparatus 113 is preferably designed for electrochemical measurement or detection or determination of analytes A of the sample P.

In particular, the sensor arrangement or sensor apparatus 113 is designed to identify, detect and/or determine (identical or different) analytes A bonded to capture molecules M, or products derived from said analytes, in particular amplification products V of the analyte A or of different analytes A.

Figure 5:
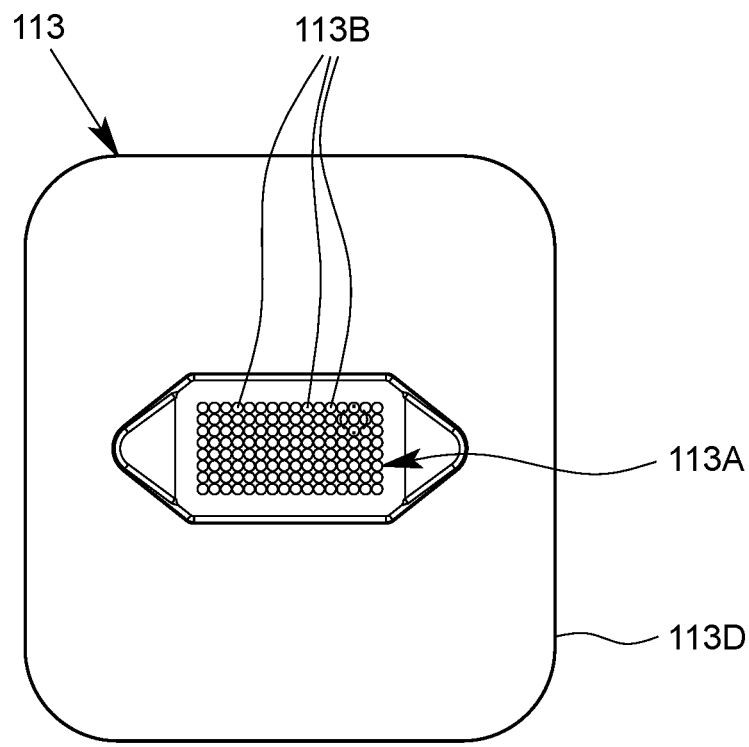
FIG. 5 is a schematic front view of a proposed sensor apparatus of the analysis system and/or of the cartridge.
Figure 6:
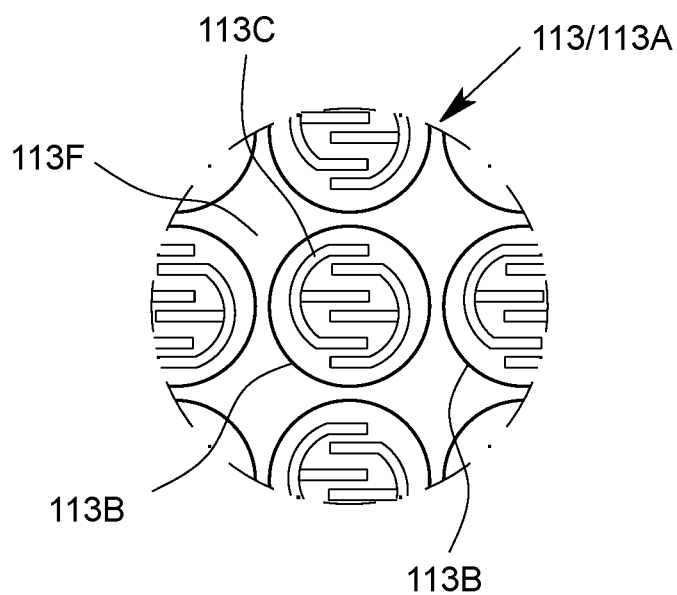
FIG. 6 is an enlarged detail of a sensor field of the sensor apparatus of FIG. 5.
Figure 7:
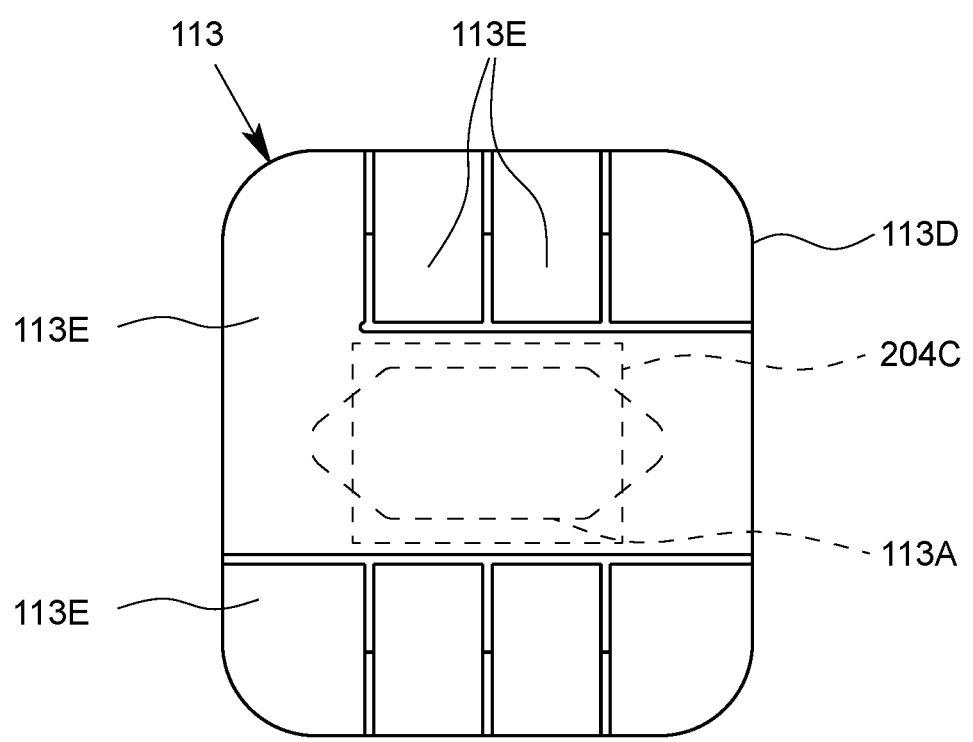
FIG. 7 is a schematic rear view of the sensor apparatus.
Figure 8:
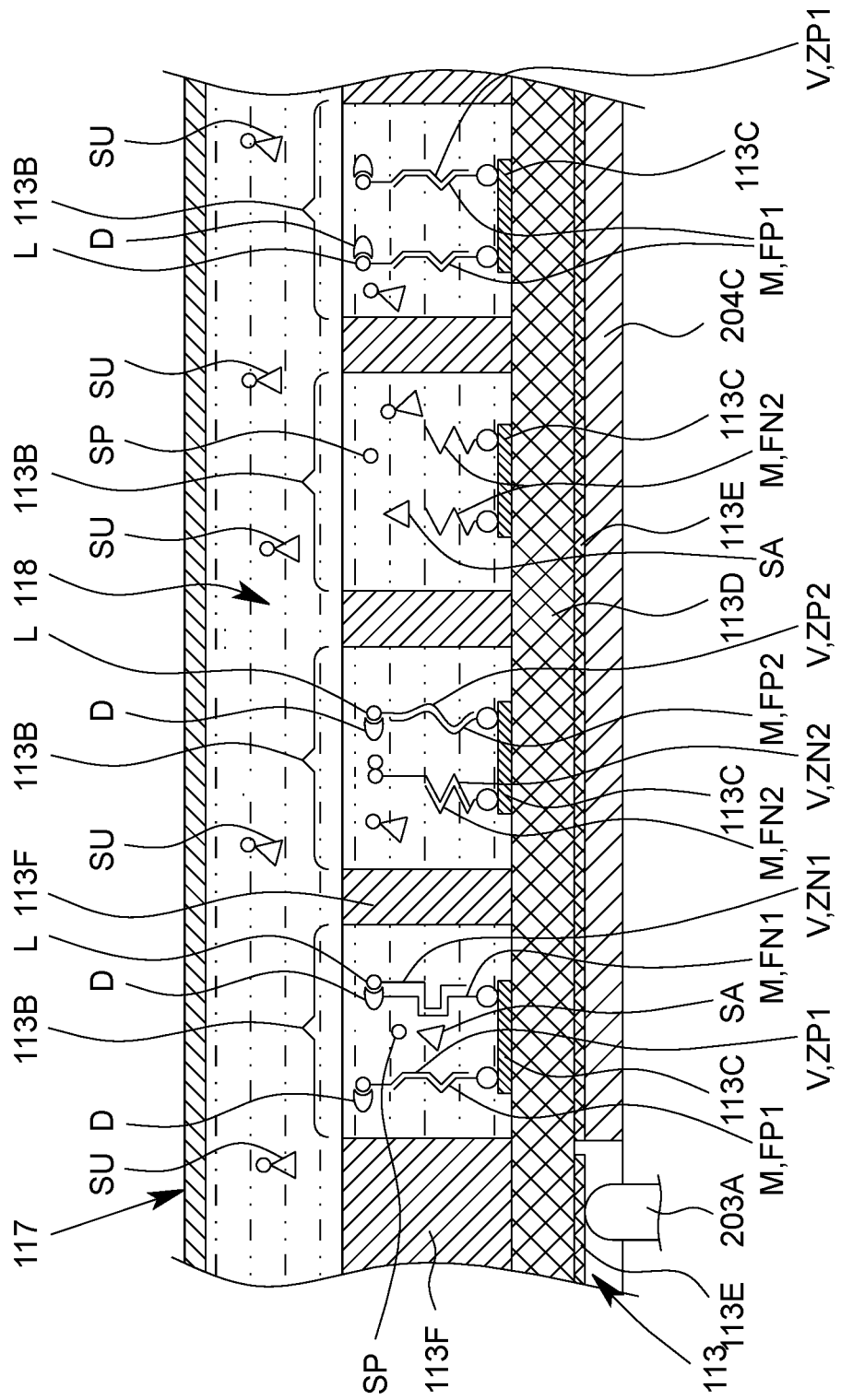
FIG. 8 is a schematic cross-sectional view of a sensor arrangement of the analysis system and/or of the cartridge comprising the sensor apparatus and a sensor cover which has been moved away.

The sensor apparatus 113 preferably comprises a sensor array 113A comprising a plurality of sensor regions or sensor fields 113B, as indicted schematically in FIG. 5, which figure schematically shows the measuring face of the sensor apparatus 113 or of the sensor array 113A. FIG. 6 is an enlarged detail of FIG. 5. FIG. 7 shows a connection face, and FIG. 8 is a schematic cross section through the sensor apparatus 113.

The sensor arrangement or sensor apparatus 113 or the sensor array 113A preferably comprises more than 10 or 20, particularly preferably more than 50 or 80, in particular more than 100 or 120, and/or fewer than 1000 or 800, sensor fields 113B.

The sensor fields 113B are in particular spatially separated measuring regions of the sensor apparatus 113 and/or of the sensor array 113A, which regions, independently from one another, allow for detection or measurement of an analyte A. Different sensor fields 113B can thus detect or measure different analytes A, respectively. It is also possible, however, for a plurality of sensor fields 113B to measure the same analyte A, again independently from one another, depending on the capture molecules M with which the sensor fields 113B are provided. Alternatively, individual sensor fields 113B may also be used for control purposes, i.e., are not used for measuring or detecting an analyte A.

The sensor apparatus 113 and/or the sensor array 113A preferably comprises a plurality of electrodes 113C. Preferably at least two electrodes 113C are arranged in each sensor region or sensor field 113B. In particular, at least or exactly two electrodes 113C which correspond to one another form a sensor field 113B, respectively.

The electrodes 113C are preferably electrically conductive and are made of metal, in particular at least have a surface made of a noble metal such as platinum or gold, and/or are coated, in particular with thiols.

The electrodes 113C are preferably finger-like and/or engage in one another, as shown in the enlargement of a sensor field 113B according to FIG. 6. Other structural solutions or arrangements are also possible, however.

Preferably each electrode pair forms a sensor field 113B or each sensor field 113B contains an electrode pair.

The electrodes 113C of a sensor field 113B preferably correspond to one another with respect to the shape and size thereof.

The sensor apparatus 113 preferably comprises a carrier or support 113D, in particular a chip, the electrodes 113C preferably being arranged on the support 113D and/or integrated in the support 113D.

The measuring face comprises the electrodes 113C and/or is the side facing the fluid, the sample P, the amplification products V and/or a sensor compartment, and/or is the side of the sensor apparatus 113 or of the support 113D comprising capture molecules M (as indicated in FIG. 8) to which analytes A or amplification products V are bonded or can bond.

The connection face of the sensor apparatus 113 or of the support 113D is preferably opposite the measuring face and/or is the side remote from the fluid, sample P and/or the amplification products V.

Particularly preferably, the measuring face and the connection face of the sensor apparatus 113 or of the support 113D are each a flat face of the in particular planar or plate-like support 113D.

The sensor apparatus 113, in particular the support 113D, preferably comprises a plurality of, in the example eight, electrical contacts or contact surfaces 113E, the contacts 113E preferably being arranged on the connection face and/or forming the connection face, as shown in FIG. 7.

The sensor apparatus 113 can preferably be electrically contacted on the connection face and/or by means of the contacts 113E, and/or can be electrically connected to the analysis device 200. In particular, an electrical connection can be established between the cartridge 100, in particular the sensor apparatus 113, and the analysis device 200, in particular the control apparatus 207, by means of electrically connecting the contacts 113E to the contact elements 203A of the connection apparatus 203.

The contacts 113E are preferably arranged laterally, in the edge region and/or, in a plan view or projection, around the electrodes 113C or the sensor array 113A, or the contacts 113E extend into the edge region of the sensor apparatus 113, in particular such that the support 113D can be electrically contacted, preferably by means of the connection apparatus 203 or the contact elements 203A, laterally, in the edge region and/or around the sensor temperature-control apparatus 204C which can be placed preferably centrally or in the middle against the support 113D.

The sensor fields 113B are preferably separated from one another, as indicated in the schematic cross section in FIG. 8. In particular, the sensor apparatus 113 comprises barriers or separations between each of the sensor fields 113B, which barriers or separations are preferably formed by an in particular hydrophobic layer 113F having corresponding recesses for the sensor fields 113B. Other structural solutions are also possible, however.

The cartridge 100 or the sensor apparatus 113 preferably comprises or forms a sensor compartment 118. The sensor compartment 118 is in particular formed between the sensor array 113A or the sensor apparatus 113 or the support 113D or the measuring face, on the one side, and a sensor cover 117, on the other side.

The sensor apparatus 113 preferably delimits the sensor compartment 118 with its measuring face or the sensor array 113A. The electrodes 113C are thus located in the sensor compartment 118.

Preferably, all the sensor fields 113B and/or all the electrodes 113C are fluidically interconnected by means of the (common) sensor compartment 118, in particular such that all the sensor fields 113B and/or electrodes 113C can come into contact with a fluid or the sample P or the analytes A via the (common) sensor compartment 118.

The sensor cover 117 can preferably be actuated and/or moved relative to the sensor apparatus 113. In particular, the sensor cover 117 can be lowered onto the sensor apparatus 113, in particular the sensor array 113A or the layer 113F, preferably such that the sensor fields 113B are closed and/or fluidically separated from one another. The sensor cover 117 can particularly preferably be actuated pneumatically and/or by means of a pressure generator. However, other solutions are also possible here.

In particular, the fluid can be displaced out of the sensor compartment 118 by means of the sensor cover 117 or by lowering the sensor cover 117 onto the sensor apparatus 113.

The sensor cover 117 is consequently designed to seal off and/or fluidically separate the individual sensor fields 113B from one another for the actual measurement, preferably such that no fluid exchange can take place between the sensor fields 113B at least during the measurement.

The sensor apparatus 113 or the sensor compartment 118 is fluidically connected to the fluid system 103, in particular the reaction cavity/cavities 109, in particular when the sensor cover 117 is moved away, in particular such that the measuring face of the sensor apparatus 113 or the sensor array 113A can be supplied with fluids, in particular the (pre-treated) sample P or portions thereof, or the analytes A and/or reagents.

The sensor compartment 118 can thus be loaded with fluids and/or fluids can flow through said compartment, at least when the sensor cover 117 is raised or moved away from the sensor apparatus 113 or the sensor array 113A.

The sensor apparatus 113 preferably comprises a plurality of in particular different capture molecules M for bonding the analytes A, preferably different capture molecules M being arranged and/or immobilized in or on different sensor fields 113B and/or being assigned to different sensor fields 113B.

Particularly preferably, the sensor fields 113B and/or electrodes 113C are provided with the capture molecules M, in particular already in the delivery state or at the factory, and/or the capture molecules M are immobilized or fixed in or on the sensor fields 113B or electrodes 113C, in particular already in the delivery state or at the factory.

As already explained at the outset, the capture molecules M are preferably capture proteins FP, in particular capture antigens and/or capture antibodies, and capture nucleic acid sequences FN, in particular capture DNA sequences and/or capture RNA sequences, oligonucleotides or fragments of PCR products, and/or, in particular in addition or alternatively to the capture proteins FP, capture aptamers.

The cartridge 100 or the sensor apparatus 113 preferably comprises a first group of capture molecules M, such as capture proteins FP or capture aptamers, for bonding a first type of target molecules or analytes A, and in particular a second group of (other) capture molecules M, such as capture nucleic acid sequences FN, for bonding another type of target molecules or analytes A. Particularly preferably, the first group of capture molecules M, in particular in contrast with the second group of capture molecules M, either can preferably be thermally blocked, deactivated and/or denatured, preferably by heating, such as capture proteins FP, or can be thermally activated, such as capture aptamers, such that in particular two different assays can be performed using the two groups of capture molecules M, in particular in succession and/or on the same cartridge 100 or sensor apparatus 113.

The cartridge 100 or sensor apparatus 113 preferably comprises both capture nucleic acid sequences FN (FN1, FN2) and capture proteins FP (FP1, FP2) as capture molecules M, as indicated in FIG. 8. In an alternative embodiment, the cartridge 100 or sensor apparatus 113 comprises both capture nucleic acid sequences FN and, in particular as an alternative to the capture proteins FP, capture aptamers, as capture molecules. Furthermore, embodiments are also possible in which the cartridge 100 or sensor apparatus 113 comprises both capture proteins FP and capture aptamers as capture molecules, the capture aptamers in this case preferably being designed to bond different target analytes than the capture proteins FP or target analytes that are different from the target proteins ZP, such as other low-molecular substances, steroids, organophosphates or the like.

As shown in FIG. 8, some or all of the sensor fields 113B or electrodes 113C are preferably provided, respectively, with both capture proteins FP and capture nucleic acid sequences FN, in particular in order to be able to detect the target proteins ZP that correspond to the capture proteins FP and target nucleic acid sequences ZN that correspond to the capture nucleic acid sequences FN, by means of the sensor apparatus 113 and/or in the corresponding sensor fields 113B and/or on the corresponding electrodes 113C.

In other words, preferably both capture proteins FP and capture nucleic acid sequences FN are applied or fixed or immobilized in a common sensor field 113B and/or on a common electrode 113C and/or directly next to one another, as is shown in FIG. 8 for the first and second sensor field 113B (from the left).

A sensor field 113B is thus preferably used not only for detecting one analyte A but instead for detecting and in particular measuring at least two analytes A, specifically a target protein ZP (in FIG. 8, e.g., ZP1 or ZP2), on the one hand, and a target nucleic acid sequence ZN (in FIG. 8, e.g., ZN1 or ZN2), on the other hand. In this case, the corresponding capture molecules M, specifically capture proteins FP and capture nucleic acid sequences FN can be or are arranged and/or immobilized together on each of the electrodes 113C of the sensor field 113B or, at least theoretically, separately on both electrodes 113C of the same sensor field 113B.

In addition, or alternatively, either just capture proteins FP or just capture nucleic acid sequences FN can be fixed or immobilized in some or all of the sensor fields 113B, as is shown by way of example in FIG. 8 for the third and fourth sensor field 113B (from the left). For example, only capture nucleic acid sequences FN2 are provided and/or immobilized in the third sensor field 113B, while only capture proteins FP1 are provided and/or immobilized in the fourth sensor field 113B.

Preferably, different capture proteins FP1 or FP2 and/or different capture nucleic acid sequences FN1 or FN2 are provided for the different sensor fields 113B or the different electrode pairs or electrodes 113C, in order to specifically bond different analytes A in the sensor fields 113B, in particular different target proteins ZP1, ZP2, on the one hand, and different target nucleic acid sequences ZN1, ZN2 on the other hand.

Particularly preferably, the sensor apparatus 113 or the sensor array 113A allows for qualitative and/or quantitative determination of the analytes A bonded in each sensor field 113B.

The sensor apparatus 113, in particular the support 113D, preferably comprises at least one, preferably a plurality of, electronic or integrated circuits, in particular the circuits being designed for detecting electrical currents and/or voltages that are generated at the sensor fields 113B preferably in accordance with the redox cycling principle.

Particularly preferably, the measurement signals of the different sensor fields 113B are separately detected or measured by the sensor apparatus 113 or the circuits.

Particularly preferably, the measurement signals are converted directly by the sensor apparatus 113 or by the integrated circuits into digital signals or data that can be read out in particular by or using the analysis device 200.

The sensor apparatus 113 or the support 113D is particularly preferably designed as described in EP 1 636 599 B1 and corresponding U.S. Pat. No. 7,914,655 B2.

A preferred sequence of an examination or test or analysis using the proposed analysis system 1 and/or analysis device 200 and/or the proposed cartridge 100 and/or according to the proposed method will be explained in greater detail in the following, by way of example.

The analysis system 1, the cartridge 100 and/or the analysis device 200 is preferably designed for performing the proposed method.

In the proposed method, a plurality of (different) assays for detecting or identifying (different) target analytes of the sample P are performed, in particular sequentially and/or in the same cartridge 100 or sensor apparatus 113. Preferably, at least or exactly two (different) assays from the selection group consisting of a protein assay, a nucleic acid assay and/or an aptamer assay are performed.

Preferably, a protein assay for detecting or identifying a target protein ZP, in particular target antigen and/or target antibody, is performed. In particular target proteins ZP, as analytes A of the sample P, are bonded to corresponding capture molecules M, in particular capture proteins FP.

Preferably, a nucleic acid assay for detecting or identifying a target nucleic acid sequence ZN, in particular a target DNA sequence and/or target RNA sequence, is performed, in particular in addition to the protein assay. Particularly preferably, target nucleic acid sequences ZN, as analytes A of the sample P, are bonded to corresponding capture molecules M, in particular capture nucleic acid sequences FN.

Optionally, in particular as an alternative to the protein assay, an aptamer assay for detecting or identifying a target protein ZP or another target analyte that is different from the target protein ZP, is performed. As already explained, the aptamer assay may, however, also be performed in addition to the protein assay and/or as an alternative to the nucleic acid assay. In the following, however, initially a first, particularly preferred variant of the method will be described, in which both a protein assay and a nucleic acid assay are performed. However, any statements relating to preparing and/or performing the respective assays apply correspondingly to other combinations of the selection group consisting of a protein assay, a nucleic acid assay and/or an aptamer assay.

In the nucleic acid assay, preferably at least one analyte A of the sample P is copied or amplified, in particular by means of PCR. A method step of this kind is preferably omitted when the protein assay is performed.

However, unless specified more precisely, the method steps described in the following are in principle preferably provided both in the nucleic acid assay and the protein assay.

In particular, the bonded analytes A or the amplification products V thereof are electrochemically detected or identified both in the nucleic acid assay and in the protein assay.

The method can in particular be used in the field of medicine, in particular veterinary medicine, for example, in order to detect or identify diseases and/or pathogens in a sample P.

At the start of the proposed method, firstly a sample P comprising at least one analyte A, preferably a fluid or a liquid from the human or animal body, in particular blood, saliva or urine, is preferably introduced into the receiving cavity 104 via the connection 104A, it being possible for the sample P to be pre-treated, in particular filtered.

Preferably, the cartridge 100 together with the sample P is subsequently connected to the analysis device 200, in particular inserted or slid into the analysis device 200 at least in part, particularly preferably from the top.

The method sequence, in particular the flow and conduction of the fluids, the mixing and the like, is controlled by the analysis device 200 or the control apparatus 207, in particular by means of corresponding activation and actuation of the pump drive 202 or the pump apparatus 112 and/or the actuators 205 or valves 115.

Preferably, the sample P or a portion or supernatant of the sample P is removed from the receiving cavity 104 at the bottom or via the outlet 104C, preferably in order to perform the nucleic acid assay, and/or centrally or via the intermediate connection 104D, in particular in order to perform the protein assay, and is preferably fed to the mixing cavity 107 in a metered manner.

The sample P is preferably metered in the cartridge 100, in particular in or by means of the first metering cavity 105A and/or second metering cavity 105B, prior to being introduced into the mixing cavity 107. In this case, in particular the upstream and/or downstream sensor portions 116 with the assigned sensors 206 are used in order to allow for the desired metering. Other solutions are also possible, however.

In the mixing cavity 107, the sample P is prepared for the further analysis and/or is mixed with a reagent, preferably with a liquid reagent F1, from a first storage cavity 108A, and/or with one or more dry reagents S1, S2 and/or S3 that are preferably provided in the mixing cavity 107.

The liquid reagent F1 may be reagents, in particular a PCR master mix for the amplification reaction or PCR and/or a sample buffer. Preferably, the PCR master mix comprises nuclease-free water, enzymes for performing the PCR, in particular at least one DNA polymerase, nucleoside triphosphates (NTPs), in particular deoxynucleotides (dNTPs), salts, in particular magnesium chloride, and/or reaction buffers.

The dry reagents S1, S2 and/or S3 can also be reagents necessary for performing an amplification reaction or PCR, that are provided in dry, in particular lyophilized form. Preferably, the dry reagents S1, S2 and/or S3 are selected from in particular lyophilized enzymes, preferably reverse transcriptases, DNA polymerases, NTPs, dNTPs and/or salts, preferably magnesium chloride.

The dissolving or mixing in the mixing cavity 107 takes place or is assisted in particular by introducing and/or blowing in gas or air, in particular from below or via the outlet. This is carried out in particular by means of corresponding pumping of gas or air in the circuit, by means of the pump or pump apparatus 112.

A desired volume of the sample P that is mixed and/or pre-treated in the mixing cavity 107 is subsequently preferably fed to one or more reaction cavities 109, particularly preferably via (respectively) one of the optional intermediate cavities 106A to 106C arranged before or upstream of the respective reaction cavities 109 and/or with different reagents or primers, in this case dry reagents S4 to S6, being added or dissolved.

Particularly preferably, in particular in the nucleic acid assay, the (pre-mixed) sample P is split into several, preferably equally sized, sample portions and/or is distributed, preferably evenly or in equally sized sample portions, among the intermediate cavities 106A to 106C and/or reaction cavities 109.

The amplification reactions or PCRs for amplifying/copying the analytes A or target nucleic acid sequences ZN are performed in the reaction cavities 109. This is carried out in particular by means of the assigned, preferably common, reaction temperature-control apparatus(es) 204A and/or preferably at the same time for all the reaction cavities 109, i.e., in particular having identical cycles and/or temperatures (or temperature curves).

The PCR or PCRs are performed on the basis of protocols or temperature profiles that are known in principle to a person skilled in the art. In particular, the mixture or sample volume located in the reaction cavities 109 is preferably cyclically heated and cooled.

Preferably, nucleic acid products and/or target nucleic acid sequences ZN are created from the analytes A, as amplification products V, in the reaction cavity or cavities 109.

In the nucleic acid assay, a label L is generated and/or attached to the analytes A or amplification products V or target nucleic acid sequences ZN, in particular directly and/or during the amplification reaction(s) (in each case). This is achieved in particular by using corresponding, preferably biotinylated, primers. However, the label L can also be created and/or bonded to the analytes A, amplification products V, target nucleic acid sequences ZN and/or target proteins ZP separately or later, optionally also only in the sensor compartment 118 and/or after hybridization. In particular, in the protein assay, a label L is bonded to the analytes A or target proteins ZP only after hybridization of the analytes A or target proteins ZP to the capture molecules M.

The label L is used in particular for detecting bonded analytes A and/or amplification products V. In particular, the label L can be detected or the label L can be identified in a detection process, as will be explained in greater detail in the following.

Particularly preferably, it is provided to perform a plurality of amplification reactions or PCRs with different primers S4 to S6 and/or primer pairs, in parallel and/or independently of one another, such that overall a plurality of (different) analytes A and/or target nucleic acid sequences ZN can be amplified in parallel and subsequently analyzed.

After the sample P or the amplification products V has/ have been fed to the sensor apparatus 113, the amplification products V are hybridized to the capture molecules M.

Following the hybridization or bonding of the sample P or groups or analytes A or amplification products V to the capture molecules M, the detection takes place, in particular by means of the label L, which is preferably provided, or in another manner.

A particularly preferred variant of the detection, specifically electrochemical detection, will be explained in greater detail in the following, but another form of detection, for example, optical detection, capacitive detection or the like can also be carried out.

Following the respective bonding/hybridization, an optional washing process is preferably carried out and/or further reagents or liquids are optionally supplied, in particular from the storage cavities 108B to 108E.

Subsequently or following the washing process, according to a preferred variant of the method, the detection of the amplification products V bonded to the capture molecules M takes place.

In order to detect the analytes A or amplification products V bonded to the capture molecules M, a reagent F4 and/or detector molecules D, in particular alkaline phosphatase/streptavidin, is/are fed to the sensor arrangement or sensor apparatus 113, preferably from the storage cavity 108D.

Particularly preferably, the reagent F4 and/or the detector molecules D is/are supplied to the sensor arrangement or sensor apparatus 113 via its outlet (with respect to the sample P or sample portions) or from the top, for the detection or the pre-treatment. In particular, the reagent F4 or the detector molecules D and the sample P or sample portions are fed to the sensor arrangement or sensor apparatus 113 from different sides.

Within the meaning of the present invention, "detector molecules" are preferably to be understood to be molecules which bond specifically to the marker or label L of the (bonded) analytes A or amplification products V and thus allow for the detection thereof.

In particular, the detector molecules D may be enzyme conjugates and/or immunoconjugates which bond specifically to the marker or the label L, in particular biotin, and comprise a reporter enzyme for converting a substrate SU.

The reagents F4 or detector molecules D can bond to the bonded analytes A or amplification products V, in particular the label L of the bonded analytes A or amplification products V, particularly preferably the biotin marker, as indicated in FIG. 8.

In connection with the detection, it may furthermore be provided to feed further liquid reagents F3 and/or F5 from the storage cavities 108C or 108E to the sensor apparatus 113.

Optionally, a (further) washing process or rinsing is carried out subsequently or after the bonding of the reagents F4 or detector molecules D to the analytes A or amplification products V or the label L, preferably by means of the fluid or reagent F3 or wash buffer, in particular in order to remove unbonded reagents F4 and/or detector molecules D from the sensor arrangement or the sensor compartment 118.

Preferably, a reagent S8 or substrate SU for the detection is finally fed to the sensor apparatus 113, in particular from the storage cavity 106D, preferably together with a fluid or reagent F2 that is suitable for the substrate SU, in particular a buffer, particularly preferably for dissolving the reagent S8 or substrate SU, the fluid or reagent F2 in particular taken from the storage cavity 108B.

After the substrate SU has been added, the sensor cover 117 is preferably lowered in order to isolate the sensor fields 113B from one another and/or to minimize substance exchange therebetween.

The substrate SU preferably reacts on or with the bonded analytes A or amplification products V or detector molecules D, and/or allows for electrochemical measurement thereof.

The substrate SU is preferably split by means of the bonded detector molecules D, in particular the alkaline phosphatase of the bonded detector molecules D, preferably into a first, in particular electrochemically active or redox active, substance SA, such as p-aminophenol, and into a second substance SP, such as phosphate.

The first or electrochemically active substance SA is preferably detected in the sensor apparatus 113 or in the individual sensor fields 113B by means of electrochemical measurement and/or redox cycling.

Particularly preferably, specifically a redox reaction at the electrodes 113C takes place by means of the first substance SA, the first substance SA preferably discharging electrons to or receiving electrons from the electrodes 113C.

In particular, the presence of the first substance SA and/or the respective amounts, in the respective sensor fields 113B, is detected by means of the associated redox reactions. It is thus possible to qualitatively and in particular also quantitatively determine whether and how many analytes A or amplification products V are bonded to the capture molecules M in the respective sensor fields 113B. This accordingly provides information regarding which analytes A, in particular also in what amounts, are or were present in the sample P or the sample portions.

In particular, by the redox reaction with the first substance SA an electrical current signal is generated at the assigned electrodes 113C, the current signal preferably being detected by means of an assigned electronic circuit.

Depending on the current signal of the electrodes 113C generated in this manner, a determination is made as to whether and/or where hybridization to the capture molecules M has taken place.

The measurement preferably takes place just once and/or for the entire sensor array 113A or for all the sensor fields 113B, in particular simultaneously and/or in parallel. In particular, the bonded analytes A or amplification products V are detected, identified or determined simultaneously or in parallel in a single or common detection process.

In particular, the bonded analytes A of all the sample portions are detected, identified or determined together or in a single or common detection process.

It is in principle also possible, however, to measure a plurality of sample portions in the sensor apparatus 113 or in a plurality of sensor apparatuses 113 in succession or sequentially or separately.

The examination/test results or measurement results 713 which have been determined by means of the examination/testing method described above or another examination/testing method are transmitted in particular electrically to the analysis device 200 or the control apparatus 207 thereof, preferably by means of the electrical connection apparatus 203. The measurement results 713 are preferably transmitted to the operating instrument 400 from or by the analysis device 200, and/or are preferably prepared, evaluated, stored, displayed and/or output by the operating instrument 400.

The measurement result(s) 713 of the sensor apparatus 113 is/are preferably transmitted from the cartridge 100 to the analysis device 200 and/or retrieved by the analysis device 200 from the cartridge 100 or the sensor apparatus 113. For this purpose, the analysis system 1 is preferably designed to transmit the measurement result 713 of the sensor apparatus 113 to the operating instrument 400 from the cartridge 100, from the analysis device 200 and/or via the analysis device 200. This is indicated in FIG. 4 by the arrow 607, which corresponds to retrieval of results by the analysis device 200 from the cartridge 100.

The measurement result(s) 713, i.e., in particular the result of the examination or test of the sample P by means of the analysis device 200, is/are preferably transmitted to the operating instrument 400 without prior evaluation or can be transmitted without prior evaluation. This is indicated in FIG. 4 by the arrow 608, which corresponds to data transmission from the analysis device 200 to the operating instrument 400.

Transmitting the measurement results 713 without prior evaluation in the analysis device 200 allows for evaluation outside the analysis device 200 that is individual and/or adjustable in a simple manner.

Transmitting the measurement result 713 without prior evaluation can also be referred to as transmission of unprocessed measurement results 713. This is intended to mean that, although processing in terms of data transmission can take place, as is provided for by transmission protocols, in order to address transmission errors or the like, it is not provided that the measurement results 713 are interpreted prior to the transmission, i.e., the significance of measurement results is not established and, if applicable, conclusions are not drawn regarding characteristics of the sample P. In the present case of a biological sample P, this means in particular that measurement results 713 are assigned to the presence of particular substances/analytes and/or concentrations and/or diseases or the like not in the analysis device 200 but instead externally.

The evaluation of the measurement results 713 is preferably carried out in the operating instrument 400, after the operating instrument 400 has received the measurement results 713 from the analysis device 200 or the cartridge 100. In FIG. 4, the evaluation process by means of the operating instrument 400 is indicated by the arrow 609.

The evaluation of the measurement results 713 by the operating instrument 400 can also take place independently of and/or separately and/or disconnected from the analysis device 200.

As already mentioned above, the operating instrument 400 can determine and/or retrieve evaluation information 530 on the basis of the cartridge identifier 100C and/or the device identifier 200C, in particular from the database 500. The evaluation information 530 is designed or used for evaluating measurement results 713 determined during the examination or test. The evaluation of the measurement results 713 can be carried out by the operating instrument 400, on the basis of or using said evaluation information 530. For this purpose, the operating instrument 400 is preferably designed to retrieve and/or to receive measurement results 713 from the analysis device 200.

Preferably, the operating instrument 400 evaluates the measurement results 713 using the evaluation information 530, independently of and/or separately and/or disconnected from the analysis device 200, or is designed for this purpose. It is thus possible to disconnect or break or terminate the data connection DVA between the analysis device 200 and the operating instrument 400 after the measurement results 713 have been retrieved, and to also perform the evaluation separately and/or disconnected from the analysis device 200.

In particular, the evaluation information 530 comprises instructions, in particular an algorithm, in order to compute or calculate with the measurement results 713 and for assigning said results to a physical quantity or characteristic. The measurement results 713 can thus be interpreted.

The evaluation information 530 is preferably individual, unique and/or specific for a specific cartridge 100 or batch CH of cartridges 100 and/or for a specific analysis device 200 and/or the combination of a specific cartridge 100 with an analysis device 200. Alternatively, or in addition, the evaluation information 530 is individual, unique and/or specific for a/the operating instrument 400, in particular an operating system of the operating instrument 400.

Different (pieces of) control information 510 and/or calibration information 520 and/or evaluation information 530 may be provided for the same cartridge 100, in particular if different examinations or tests can be performed using the same cartridge 100, and the information corresponds to one of the examinations or tests that can be performed, respectively.

The operating instrument 400 preferably outputs, or is designed to output, by means of the output apparatus 410, the evaluation results 740 that are determined, in particular calculated, by evaluating the measurement results 713 using the evaluation information 530. For this purpose, the operating instrument 400 may show the evaluation results 740 graphically or in another manner, in particular by means of the screen or display 411. Alternatively or in addition, the operating instrument 400 sends the evaluation results 740 to the database 500, or is designed for this purpose.

Preferably, a computer program product is provided which comprises program code means for performing the proposed method. This is in particular an instruction stored on a storage medium, in particular in the form of a smartphone app or the like, which is set up to determine and/or receive the cartridge identifier 100C. Alternatively or in addition, said instruction is designed to transmit the cartridge identifier 100C to the database 500 and to thereupon receive control information 510 from the database 500. Alternatively, or in addition, said instruction is designed to transmit or forward control information 510 to the analysis device 200. Alternatively, or in addition, said instruction is designed to receive, evaluate and/or interpret measurement results 713, in particular using retrieved and/or received evaluation information 530.

The evaluation of the measurement results 713 preferably comprises assigning or allocating measurement results 713, corresponding to particular sensor fields 113B, to functions of the respective sensor fields 113B. This can be achieved by using different evaluation methods, threshold values or the like being used for different sensor fields 113B.

It is possible for similar sensor fields 113B to be evaluated together. In this case, it is preferable for measurement results 713 corresponding to similar sensor fields 113B to be examined for significant deviations, and for measurement results 713 having significant deviations with respect to other measurement results 713 of similar sensor fields 113B to be rejected, and for only similar measurement results 713 of similar sensor fields 113B to be evaluated.

The evaluation result 740, which preferably corresponds, preferably directly, to a physical quantity or characteristic of the sample P, is generated by means of the evaluation of the measurement results 713. For example, the evaluation result 740 represents the presence of specific DNA sequences and/or RNA sequences, and/or proteins, in particular antigens and/or antibodies.

Alternatively or in addition, however, the evaluation result 740 may also be or comprise an interpretation that is derived from the presence of the DNA sequences and/or RNA sequences and/or proteins, in particular antigens and/or antibodies, in particular the information relating to the presence or the likelihood of the presence of a specific disease and/or pathogen, such as that of a virus, a bacterium or the like, in the sample P.

The evaluation result 740 is preferably output by the output apparatus 410 of the operating instrument 400 or can be output, in particular displayed, by the output apparatus 410.

In the event of a disease and/or a pathogen being identified, it may be provided for the operating instrument 400 to automatically output or send a warning and/or message.

Measurement results 713 and/or evaluation results 740 are preferably archived. Particularly preferably, said results are stored or temporarily stored in the operating instrument 400. Alternatively, or in addition, said results are stored or archived in the database 500, in particular in the results memory 550 of the database 500. For this purpose, the evaluation results 740 can be transmitted from the operating instrument 400 to the database 500 by means of data transmission 610.

The archiving in the database 500 can take place in a manner temporally offset from the generation of the evaluation results 740 or the retrieval or receipt of the measurement results 713. This is the case in particular if the examination/test or evaluation takes place without an existing data connection DVD between the database 500 and the operating instrument 400. In this case, the measurement results 713 and/or evaluation results 740 can be transmitted to the database 500 in a temporally offset manner and/or at a later time, as soon as the data connection DVD is restored or can be re-established.

In the following, primarily a proposed method for, in particular, quantitatively determining an analyte A of the sample P and/or for evaluating the measurement results 713 will be explained.

"Determination of the analyte A" is preferably a determination of whether and/or in what absolute and/or relative frequency or concentration K the analyte A appears or is contained in the sample P.

In principle, however, the steps described above may also be part of the proposed method. The focus of the following explanations is on the evaluation of the measurement results 713 that are determined or measured in particular by means of the sensor apparatus 113.

Figure 9:
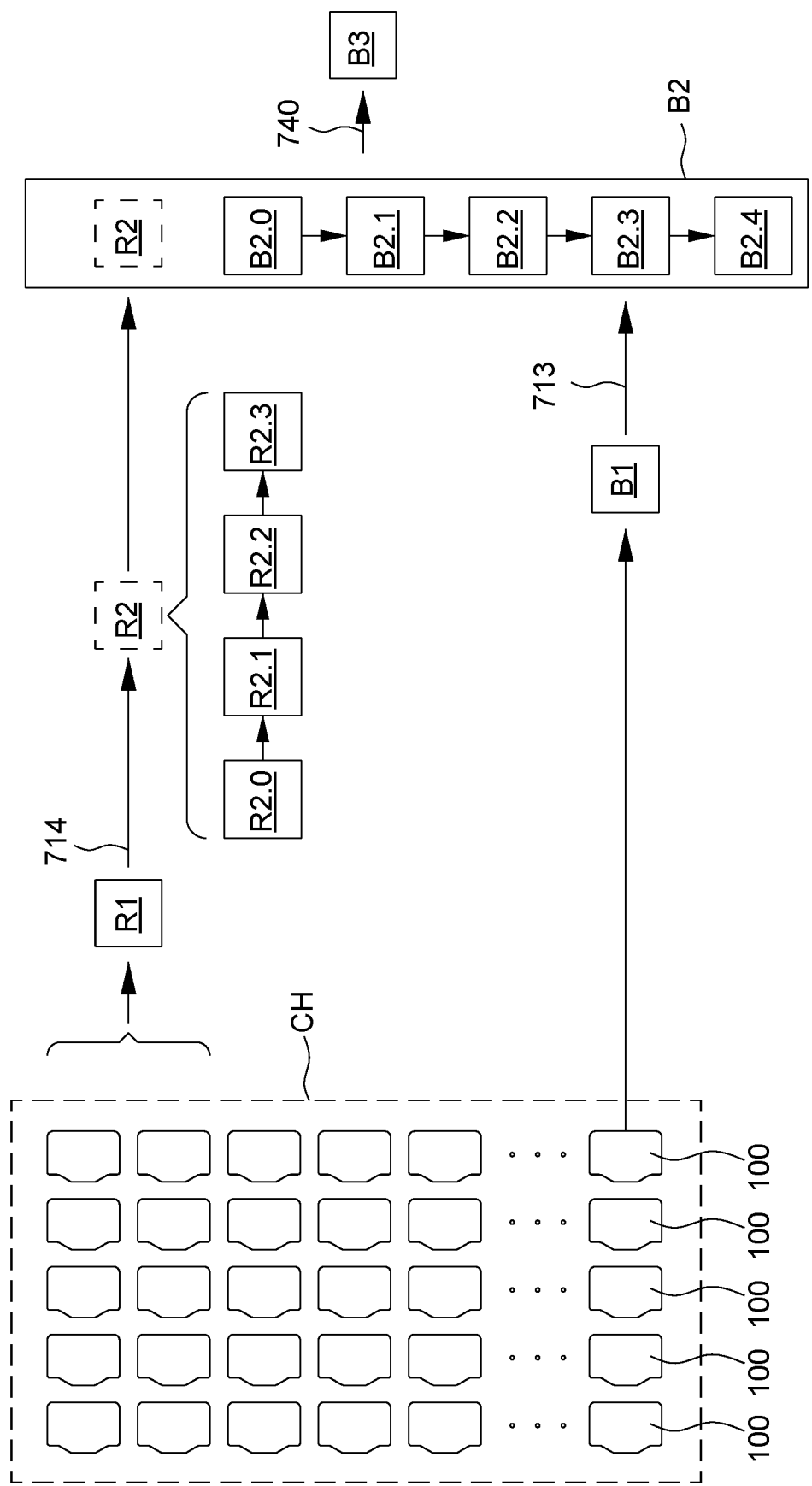
FIG. 9 schematically shows a method for determining an analyte.

FIG. 9 schematically shows a method for determining the analyte A.

A batch CH of cartridges 100 is shown schematically on the left-hand side in FIG. 9.

As can be seen in particular from the top part of FIG. 9, in a first step R1 preferably reference measurements or measurements on reference samples, in particular having a known or specified frequency or concentration K of the analyte A, are made. In particular, reference results 714 are generated or measured in this case.

The measurements on the reference samples are sometimes also referred to for short in the following as reference measurements.

In a further step R2, the reference results 714 are evaluated. The evaluation of the reference results 714 or step R2 will be explained in more detail later.

The measurements on reference samples (step R1) and/or the evaluation of the reference results 714 (step R2) are not necessarily steps or parts of the method according to the invention, but can optionally also be performed independently of and/or prior to the method according to the invention. In this case, preferably only the results, in particular the (evaluated and/or normalized) reference results 714, are used in the method according to the invention.

As shown in particular in the bottom part of FIG. 9, in a step B1, using a cartridge 100 of the batch CH, a measurement is made on an in particular unknown sample P, or the sample P is measured. In this case, in particular the measurement results 713 are measured or generated. This preferably takes place after the measurement of the reference sample or after step R1.

In a further step B2, the measurement results 713 are evaluated, in particular together with or taking account of the reference results 714.

The evaluation of the reference results 714 or the step R2 preferably takes place before step B2 or before the evaluation of the measurement results 713, and/or separately from or independently of the evaluation of the measurement results 713. It is also possible, however, for the evaluation of the reference results 714 (step R2) to form a sub-step of the evaluation of the measurement results 713 (step B2), as indicated in particular in FIG. 9 with dashed lines, and/or for the evaluation of the reference results 714 to take place after the measurement of the sample P (step B1). The evaluation of the measurement results 713 will be explained in more detail later.

Preferably one or more evaluation results 740 are generated or formed in step B2 or during the evaluation. The evaluation result 740 is in particular an absolute or relative frequency or concentration K of one or more analytes A in the sample P.

In an optional further step B3, the evaluation result 740 is preferably displayed and/or output, in particular by means of the operating instrument 400 or the output apparatus 410 thereof. The evaluation result 740 can also be output in another manner, however, for example, by means of forwarding the evaluation result 740 to another system or another device, in particular a server or computer. The forwarding or output of the evaluation result 740 can in particular take place via a wireless connection.

The sample P is preferably an unknown sample or a sample having an unknown content and/or unknown composition. In particular, the analytes A contained in the sample P, and/or the absolute and/or relative frequency and/or concentration K thereof, is/are unknown.

The sample P is preferably taken from an animal or a human, and may for example, be a blood or saliva sample. The sample P is preferably examined/tested or the analyte A is preferably determined on-site and/or shortly after the sample has been taken, preferably in a barn, in a practice or the like.

The cartridge 100, by means of which the sample P is examined or tested, is preferably a cartridge 100 from a batch CH of a plurality of similar or at least substantially identical cartridges 100 which were produced in a batch process.

The cartridges 100 of a batch CH preferably comprise the same reagents F, S for examining or testing the sample P, and/or the reagents F, S of the cartridges 100 of a batch CH originate each from the same reagent batch. In particular, the cartridges 100 of a batch CH are designed for performing the same examination/test or for performing the same assay.

Preferably, the cartridges 100 can each be used just once and/or are disposable articles.

Preferably, a small portion of the cartridges 100 of a batch CH is held back or not delivered. The portion of cartridges 100 held back or not delivered is preferably at least 0.1%, especially at least 1%, in particular at least 2%, and/or preferably less than 10%, especially less than 5%, of the number of cartridges 100 in the batch CH. Alternatively or in addition, the absolute number of cartridges 100 of a batch CH that are held back or not delivered is especially at least 10, preferably at least 100, in particular at least 1000.

Preferably, reference results 714 are generated or measured using the cartridges 100 that are held back or not delivered, in particular at the factory or in a laboratory, i.e., particularly preferably separately from and/or prior to the actual measurement (on-site) using another cartridge 100 of the same batch CH. The reference results 714 preferably form part of the calibration information 520 explained above, and/or are saved or stored in the database 500.

The cartridges 100 of a batch CH that are held back are preferably used to perform measurements on or of reference samples, in which the reference results 714 are measured. The reference samples are in particular samples having known or precisely defined properties or characteristics. In particular, the relevant composition (with respect to the assay to be performed using the cartridges 100 of the batch CH) of the reference sample is known. Particularly preferably, the analytes A, in particular proteins and/or nucleic acid sequences, contained in the reference sample, and/or the absolute and/or relative frequency and/or concentration K thereof, is/are known.

In particular, different reference measurements or measurements using different reference samples are performed with the cartridges 100 of the batch CH that are held back. The different reference samples preferably differ in term of the composition thereof and/or in terms of the analytes A contained therein. In particular, the different reference samples have different concentrations K of the analyte or analytes A.

A reference sample or a plurality of identical reference samples is preferably measured using a plurality of cartridges 100. Preferably, each reference sample or a plurality of identical reference samples is measured using a family of cartridges 100 that are held back. A family of cartridges 100 preferably comprises at least 10, preferably at least 50, in particular at least 100, and/or fewer than 300, preferably fewer than 200, cartridges 100.

Preferably, reference measurements are performed using one family of cartridges 100 in each case, for at least 10, preferably at least 20, and/or at most 100, preferably at most 50, different reference samples. The reference samples preferably each differ in terms of the concentration K of the analyte A.

The sample P is measured in a cartridge 100, in order to determine the analyte A. The measurement results 713 measured in the process are particularly preferably evaluated, in particular following the measurement. The evaluation preferably comprises normalization of the measurement results 713 and/or of the reference results 714. This will be discussed further later.

In order to evaluate the measurement results 713, the reference results 714 are preferably also used, which reference results were measured previously, separately from the measurement of the sample P, during measurements of reference samples using other cartridges 100 of the same batch CH.

The measurement results 713 and the reference results 714 are preferably the same type of data or have the same data structure. The measurement results 713 and the reference results 714 preferably differ only in that the measurement results 713 were measured (on-site) on an unknown sample P using a delivered cartridge 100, whereas the reference results 714 were measured on a known sample or a plurality of known samples, using a cartridge 100 that was held back. Within this meaning, the measurement results 713 and the reference results 714 are preferably of a similar or identical structure.

Measurement results 713 and/or reference results 714 within the meaning of the present invention may for example, be measured voltages, currents, resistances, conductivities, brightness values, intensities colors, contrasts and/or progressions or differences of the mentioned quantities.

During the evaluation, the analyte A is preferably determined from the normalized measurement results 713. In particular, the analyte A is determined qualitatively and/or quantitatively. Preferably, an absolute or relative frequency or concentration K of the analyte A in the sample P is determined.

Preferably, a plurality of and/or different analytes A are measured and/or determined simultaneously.

The evaluation of the reference results 714 and/or measurement results 713 is shown schematically in FIG. 9.

The evaluation of the reference results 714 (step R2) preferably comprises a plurality of steps; in the example shown, steps R2.0 to R2.3.

As indicated in FIG. 9, the evaluation of the reference results 714 (step R2) may take place before the evaluation of the measurement results 713 (step B2), and/or independently thereof or alternatively together or simultaneously with the evaluation of the measurement results 713.

In an optional step R2.0, the reference results 714 can be prepared or edited. For example, the reference results 714 can be cleaned of a background or offset, noise in the reference results 714 can be eliminated, the reference results 714 can be corrected by an offset, or the like.

In a step R2.1, which in particular follows the (optional) step R2.0 and/or the preparation or editing of the reference results 714, the reference results 714 are preferably normalized. The normalization will be explained in more detail later.

The reference results 714 are preferably normalized in families and/or separately for each of the concentrations K measured during the reference measurements. In particular, during normalization of reference results 714 measured using a family of cartridges 100 or at a specific concentration K, reference results 714 that were measured using another family of cartridges 100 or at another concentration K are not taken into account or included.

In a step R2.2, which in particular follows step R2.1 and/or the normalization of the reference results 714, the preferably normalized reference results 714 are preferably combined to form an intermediate result or a reference point RP, in particular a plurality of reference points RP.

The reference results 714 of every reference sample are preferably each combined to form a reference point RP of the respective reference sample. Thus, different (associated) reference points RP preferably result for different reference samples, in particular for each frequency or concentration K of the analyte A measured in a reference measurement, the different reference points RP or the reference points RP of different frequencies or concentrations K preferably differing from one another.

The reference point RP preferably has two coordinates or values. The first coordinate or the x-value of the reference point RP is preferably the frequency or concentration K of the analyte A in the respective reference sample. The second coordinate or the y-value of the reference point RP is preferably the combination of the reference results 714 of the reference sample. In particular, the second coordinate or the y-value of the reference point RP is an average value, in particular the arithmetic, harmonic or geometric mean, the median, or the like, of the reference results 714 of the reference sample.

The reference point RP may, however, also be a multi-dimensional point or comprise more than two coordinates or be determined by more than two coordinates.

Figure 10:
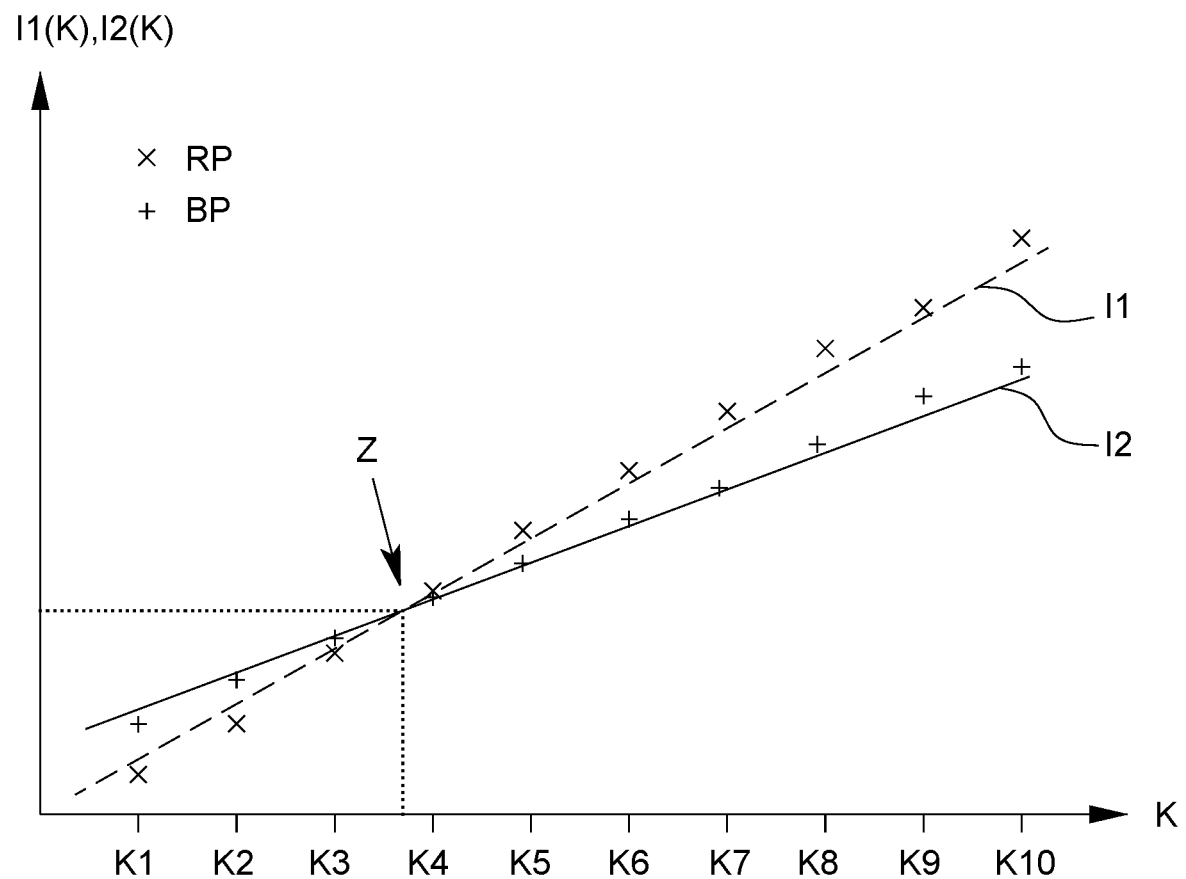
FIG. 10 is a plot that shows a quantitative determination of the analyte.

Reference points RP, determined in different reference samples, for different concentrations K1 to K10 of the analyte A, are shown by way of example in FIG. 10. The reference points RP are symbolized by crosses.

In an optional, but preferred, step R2.3, which in particular follows step R2.2 and/or the combination of the normalized reference results 714 to form reference points RP, a first function I1 is preferably formed from the reference points RP. The first function I1 is preferably a function I1(K) of the frequency or concentration K of the analyte A. Alternatively or in addition, the reference points RP and/or the function I1 are plotted or shown graphically in a diagram, graph or a coordinate system. However, a graphical representation of this kind is preferably not essential for an in particular automated or computer-assisted evaluation, and is used in this case primarily to illustrate the method.

The first function I1 preferably describes or represents, at least approximately, the progression of the reference points RP as a function of the concentration K in the reference samples. Particularly preferably, the first function I1 at least approximately represents the functional dependency of the normalized and/or combined reference results 714 or the average values, formed from the reference results 714, of the concentration K of the analyte A in a reference sample associated with the respective reference results 714. The first function I1 preferably approximates the (functional) progression and/or relationship of the combined reference results 714 or reference points RP, in particular in dependence of the concentration K. The first function I1 is preferably specific for or representative of an analyte A and a particular batch CH of cartridges 100.

In the embodiment shown, the first function I1 is a linear function or a line (of best fit). In this case, a linear function is understood to be a function of the form:

$$f(x)=m \cdot x + n.$$

The first function I1 may, however, be any desired other function, for example, a logarithmic, exponential or other polynomial function, in particular of the form:

$$f(x) = \sum_n a_n x^n$$

having any desired degree n and/or coefficients $a_n$.

The first function I1 is preferably determined by means of curve fitting, such that said function reproduces or approximates the progression or the function relationship of the reference points RP as accurately as possible. This can be achieved for example, by means of the method of least squares, by means of linear regression, by means of adjusting the first function I1 to the reference points RP, and/or by means of other suitable mathematical methods.

It is also possible for the first function I1 to be formed by means of interpolation, for example, by means of a cubic spline, or by means of a non-differentiable function which is piecewise linear between two reference points RP in each case.

The evaluation of the measurement results 713 (step B2) preferably comprises a plurality of steps; in the example shown, steps B2.0 to B2.4.

The steps when evaluating the measurement results 713 are preferably similar or identical to the steps when evaluating the reference results 714, at least in part.

In an optional step B2.0, the measurement results 713 can be prepared or edited. For example, the measurement results 713 can be cleaned of a background or offset, noise in the measurement results 713 can be eliminated, the measurement results 713 can be corrected by an offset, or the like. Step B2.0 is preferably identical to step R2.0.

In a step B2.1, which in particular follows the (optional) step B2.0 and/or the preparation or editing of the measurement results 713, the measurement results 713 are preferably normalized. The normalization will be explained in more detail later.

The measurement results 713 are preferably normalized using the same algorithm as for the reference results 714.

The measurement results 713 are preferably normalized several times and/or using different reference results 714, in particular separately from one another in each case.

Particularly preferably, the measurement results 713 are normalized separately using the reference results 714 of each family of reference measurements or cartridges 100, by means of which or on the basis of which a reference point RP was generated. The number of (separate) normalization processes with the measurement results 713 in particular corresponds to the number of reference points RP generated or determined.

Preferably, in step B2.1 and/or during the normalization of the measurement results 713, in comparison or contrast with step R2.1 and/or the normalization of the reference results 714, in a normalization process the measurement results 713 are in each case added to the reference results 714 and subsequently the normalization already performed in step R2.1 for the reference results 714 is repeated or performed again, in the same manner, using the reference results 714 and the added measurement results 713.

Owing to this approach, the normalized reference results 714 resulting in step B2.1 deviate, at least generally, from the normalized reference results 714 resulting in step R2.1, because in this case the measurement results 713 are also included in the normalization and thus influence or change the result of the normalization. In particular, the deviation between the normalized reference results 714 resulting in steps B2.1 and R2.1 is, at least generally, greater the more the frequency or concentration K of the analyte A in the unknown sample P deviates from the frequency or concentration K of the analyte A in the respective reference sample.

It is thus provided, in particular, to intentionally perform "false" normalization of the measurement results 713, i.e., normalization of the measurement results using reference results 714 which were measured at a different frequency or concentration K of the analyte A. Preferably, from the resultant deviation of the normalized reference results 714 from reference results 714 previously normalized without the measurement results 713, conclusions regarding the analyte A or the frequency or concentration K thereof in the unknown sample P are drawn, or the analyte A in the unknown sample P is (quantitatively) determined.

In a step B2.2, which in particular follows step B2.1 and/or the normalization of the measurement results 713, the preferably normalized measurement results 713 are preferably (each) used to form a determination point BP. The creation of the determination points BP is preferably carried out in a manner analogous to the determination of the reference points RP.

The determination points BP are preferably generated or determined on the basis of the measurement results 713 and the (respective) reference results 714.

The jointly normalized measurement results 713 and reference results 714 are preferably each combined to form a determination point BP of the respective reference sample or frequency or concentration K at which the reference results 714 were measured. Thus, different (associated or corresponding) determination points BP preferably result for different reference samples, in particular for each frequency or concentration K of the analyte A measured in a reference measurement, the different determination points BP or the determination points BP of different frequencies or concentrations K preferably differing from one another.

Preferably, a corresponding determination point BP is generated or determined for each reference point RP, or one reference point RP and one determination point BP correspond to one another in each case. A determination point BP corresponding to a reference point RP is preferably generated or determined on the basis of the identical or the same reference results 714 as for the reference point RP.

The determination point BP preferably has two coordinates or values. The first coordinate or the x-value of the determination point BP is preferably the frequency or concentration K of the analyte A in the respective reference sample at which the reference results 714 of the corresponding reference point RP were measured. The second coordinate or the y-value of the determination point BP is preferably the combination of the (jointly normalized) measurement results 713 and reference results 714 of the reference sample. In particular, the second coordinate or the y-value of the determination point BP is an average value, in particular the arithmetic, harmonic or geometric mean, the median, or the like, of the (jointly normalized) measurement results 713 and reference results 714 of a reference sample.

The determination point BP may, however, also be a multi-dimensional point or comprise more than two coordinates or be determined by more than two coordinates. The determination points BP and reference points RP preferably comprise the same number and/or type of coordinates.

FIG. 10 shows determination points BP by way of example, which points were determined on the basis of measurement results 713 and reference results 714 of different concentrations K1 to K10. The determination points BP are symbolized by plus signs.

The determination points BP preferably differ, at least generally, from the corresponding reference points RP, in particular by the second coordinate or the y-value. If the (at this time still unknown) frequency or concentration K of the analyte A in the unknown sample P is lower than the frequency or concentration K of the analyte A in the respective reference sample, the determination point BP is preferably, at least generally, below the corresponding reference point RP, or the determination point has a smaller second coordinate or a smaller y-value than the corresponding reference point RP.

This is in particular due to the fact that a higher frequency or concentration K of the analyte A generally leads to a higher measured value, as is also indicated in FIG. 10. If the frequency or concentration K forming the basis of the measurement result 713 is greater than the concentration K forming the basis of the reference results 714 with which the measurement result 713 is jointly normalized, in step B2.1 the normalized measurement results 713 and/or reference results 714 preferably assume (at least slightly) higher values than the normalized reference results 714 in step R2.1. In an analogous manner, smaller normalized measurement results 713 and/or reference results 714 preferably result from smaller concentrations K of the unknown sample P, compared with the reference sample or measurement. This ultimately results in the mentioned differences between the determination points BP and the corresponding reference points RP.

The mentioned differences between the determination points BP and the corresponding reference points RP are also shown by way of example in FIG. 10.

In an optional, but preferred, step B2.3, which in particular follows step B2.2 and/or the combination of the normalized measurement results 713 to form determination points BP, a second function I2 is preferably formed from the determination points BP. The second function I2 is preferably a function I2(K) of the frequency or concentration K of the analyte A (in the reference samples). Alternatively or in addition, the determination points BP and/or the function I2 are plotted or shown graphically in a diagram, graph or a coordinate system. However, a graphical representation of this kind is preferably not essential for an in particular automated or computer-assisted evaluation, and is used in this case primarily to illustrate the method.

The second function I2 preferably describes or represents, at least approximately, the progression of the determination points BP as a function of the concentration K in the reference samples. Particularly preferably, the second function I2 at least approximately represents the functional dependency of the normalized and/or combined measurement results 713 and reference results 714 or the average values, formed therefrom, of the concentration K of the analyte A in a reference sample associated with the respective reference results 714. The second function I2 preferably approximates the (functional) progression and/or relationship of the combined measurement results 713 and reference results 714 or determination points BP, in particular in dependence of the concentration K.

In the embodiment shown, the second function I2 is a linear function or a line (of best fit). In this case, a linear function is understood to be a function of the form $$f(x)=m \cdot x+n.$$

The second function I2 may, however, be any desired other function, for example, a logarithmic, exponential or other polynomial function, in particular of the form $$f(x) = \sum_n a_n x^n$$

having any desired degree n and/or coefficients $a_n$.

The second function I2 is preferably of the same functional form as the first function I1 and/or differs merely by the coefficients, in the examples shown by the coefficients m and/or n or $a_n$.

The second function I2 is preferably determined by means of curve fitting, such that said function reproduces or approximates the progression or the function relationship of the determination points BP as accurately as possible. This can be achieved for example, by means of the method of least squares, by means of linear regression, by means of adjusting the second function I2 to the determination points BP, and/or by means of other suitable mathematical methods.

It is also possible for the second function I2 to be formed by means of interpolation, for example, by means of a cubic spline, or by means of a non-differentiable function which is piecewise linear between two determination points BP in each case.

In particular, the same method or the same algorithm is used for determining the second function I2 as that for determining the first function I1.

In a step B2.4, which in particular follows the determination of the second function I2 and/or step B2.3, a point of intersection Z of the first function I1 with the second function I2 is preferably determined.

The point of intersection can be determined for example, analytically by solving the equation I1(K)=I2(K), the frequency or concentration K that satisfies the equation representing the first coordinate or the x-value of the point of intersection Z, and/or being the frequency or concentration K, sought or to be determined, of the analyte A in the unknown sample P. Other, in particular numerical or approximative, methods for solving the equation I1(K)=I2(K) or for determining the point of intersection Z or the x-value or first coordinate thereof are also possible, however.

Preferably, in the measurement the same analyte A is measured in a plurality of sensor fields 113B of the sensor apparatus 113 of the cartridge 100, independently of one another and preferably simultaneously, as already explained above. In particular separate measurement results 713 are measured thereby.

The term "separate measurement results 713" refers in particular to measurement results 713 of the same analyte A, which results are measured independently of one another and/or simultaneously in the cartridge 100 or the sensor apparatus 113, in particular in different or mutually separated sensor fields 113B.

Preferably reference results 714 of the same analyte A are used in any case for normalizing a measurement result 713 of an analyte A.

In order to normalize the measurement results 713, a plurality of measurement results 713 and/or reference results 714 are preferably assigned to a group or combined to form a group. The measurement results 713 of a group are then normalized together or taking account of or including the other measurement results 713 or reference results 714 of the group.

A group preferably comprises or consists of one or more measurement results 713 of an analyte A, and the reference results 714 of a family of cartridges 100 on which the reference measurements were taken using the same reference sample or identical reference samples.

During normalization, the measurement results 713 and/or reference results 714, in particular of a group, are preferably offset against one another and/or are used for calculations. In particular, a correction, scaling, averaging, shifting and/or transformation of the measurement results 713 and/or reference results 714 or the group can take place during the normalization. Preferably, during the normalization, the average value or mean and/or the standard deviation or spread of the measurement results 713 and/or reference results 714 of the group is changed or adjusted or transformed to another specified value.

Normalization of a measurement result 713 and/or reference result 714 is preferably carried out in a manner taking account of other measurement results 713 and/or reference results 714, in particular of the same group.

During or prior to the normalization of the measurement results 713 and/or reference results 714, said results are preferably cleaned of an offset or background or said offset or background is eliminated. The normalization may also comprise the correction of the measurement results 713 and/or reference results 714 by a line of best fit.

Further possibilities for normalization are non-linear methods such as nonparametric regression methods, in particular the methods known under the acronyms LOWESS and/or LOESS.

Particularly preferably, the measurement results 713 and/or reference results 714 are normalized by means of quantile normalization.

The normalization by means of quantile normalization will be explained in detail in the following.

Preferably, during quantile normalization, a plurality of measurement results 713 and/or reference results 714 are combined, in particular into or to form a group.

In the following, the term "measured values" will sometimes be used as a summarizing term to denote the measurement results 713, the reference results 714 and/or quantities derived or calculated therefrom. Measured values may include exclusively measurement results 713 or exclusively reference results 714, or both measurement results 713 and reference results 714, in particular may alternatively or in addition also include quantities derived from measurement results 713 and/or reference results 714, such as totals, average values or means or the like. In particular, in the following, the term "measured value(s)" can selectively be replaced by the terms "measurement result(s)", "reference results" or "measurement results and/or reference results".

The quantile normalization will be explained in the following with reference to an arrangement or display of the measured values as a matrix. It is also possible, however, for matrices not to be used in a specific implementation of the algorithm or in the quantile normalization, and/or for the measured values not to form a matrix, and/or for the algorithm to be realized or implemented in another manner.

Preferably, a matrix X comprising matrix elements $x_{ij}$ is formed or created from the measured values of a group, each matrix element $x_{ij}$ being a measured value or being formed by a measured value. In order to explain the quantile normalization, an example will be described in the following in which the row index i counts different analytes A and the column index j counts different measurements. Consequently, in this example, a row i of the matrix X contains different measurements or measured values of the same analyte A, and a column j of the matrix X contains a measurement or measured values of different analytes A. The matrix element $x_{ij}$ is therefore in particular the measured value of the ith analyte in the jth measurement, or represents said measured value. Other assignments or distributions of the measured values to or over the rows and/or columns are also possible, however. This will be discussed in greater detail later.

Different measurements j may be measurements in different sensor fields 113B and/or different cartridges 100, in particular also reference measurements, in which the reference results 714 are generated.

The aim of the normalization is that of replacing the measured values or matrix elements of the matrix X with normalized measured values or matrix elements.

During the (quantile) normalization, a normalized matrix N comprising matrix elements $n_{ij}$ is established or created or calculated from the matrix X, which normalized matrix contains the normalized measured values, in particular measurement results 713. The matrix element $n_{ij}$ preferably corresponds to the matrix element $x_{ij}$ having the same indices i and j. The matrix element $n_{ij}$ is preferably the normalized measured value that corresponds to the (original or not normalized) measured value $x_{ij}$.

For the purpose of normalization, in a first step Q1 the matrix elements of the columns j or of each column j of the matrix X are preferably first sorted, in particular according to size or magnitude.

For the purpose of sorting, the matrix elements of a column are shifted within the column. The shifts undertaken during sorting are preferably recorded, stored or noted in another manner, in particular in order to be able to reverse the shifts again in a later step or to be able to correctly re-assign the normalized measured values to the analytes A or rows of the matrix. In the following, this is symbolized in the notation by a superscript index (i) which indicates to which row i of the matrix X a matrix element is assigned or from which row i a matrix element was shifted.

The sorting is preferably carried out such that the largest measured values of all the columns are arranged in the same or a common row, the second-largest measured values of all the columns are arranged in the same or a common row, the third-largest measured values of all the columns are arranged in the same or a common row, etc., each measured value being shifted only within the column and/or not into another column. A particularly easy way for achieving this is that of ascending or descending sorting of the measured values within a column, in accordance with the size or magnitude of said values.

The sorted columns of the matrix X preferably form a sorted matrix S comprising matrix elements $s_{kj}^{(i)}=x_{ij}$, k being the row index and j the column index. The superscript index (i) characterizes to which matrix element $x_{ij}$ the respective matrix element $s_{kj}^{(i)}$ corresponds or is identical to, as is clear from the relation $s_{kj}^{(i)}=x_{ij}$, and/or to which row i of the matrix X and/or analyte A the respective matrix element is assigned. In the following, for the sake of clarity the superscript index (i) will sometimes be omitted in the notation.

The matrix elements of the columns j of the matrix S are preferably sorted in an ascending manner, in particular such that $s_{kj} \le s_{k'j}$ for k<k' applies for the matrix elements. Alternatively, the matrix elements may also be sorted in a descending manner, such that $s_{kj} \ge s_{k'j}$ for k<k' applies.

Preferably, in particular, after sorting or after step Q1, in a second step Q2 each matrix element $s_{kj}$ of the matrix S is replaced by the average value or mean of all the matrix elements of the same row of the matrix S. In particular, in the second step Q2 an averaged matrix $\bar{S}$ comprising matrix elements $\bar{s}_{kj}^{(i)}$ is formed or created. The matrix elements $\bar{s}_{kj}$ are preferably calculated by $$\bar{s}_{kj} = \frac{1}{n}\sum_{j'=1}^{n} s_{kj'},$$

n being the number of columns. Therefore, all matrix elements of a row of the matrix S are preferably of the same value.

The index (i) is preferably kept, when the matrix elements $s_{kj}^{(i)}$ are replaced by the average values or the matrix elements $\bar{s}_{kj}^{(i)}$, for each matrix element or each position in the matrix S. Two matrix elements $\bar{s}_{kj}^{(i)}$ and $s_{k'j'}^{(i')}$ thus preferably have the same index i'=i, when k=k' and j=j'.

The matrix elements $\bar{s}_{kj}^{(i)}$ preferably (already) represent the normalized measured values. In particular, the matrix element or the normalized measured value $\bar{s}_{kj}^{(i)}$ corresponds to the matrix element or measured value $x_{ij}$ or is assigned thereto.

It may be possible for the sorting or shifting of the measured values or matrix elements carried out in the first step to be reversed, or for each matrix element to be shifted to its original position or the original row, in an optional third step Q3 that in particular follows the second step Q2. In particular, the matrix S is used to create the normalized matrix N, such that $n_{ij}=\bar{s}_{kj}^{(i)}$ applies. Consequently, every row of the matrix N preferably contains different measured values of the same analyte A, analogously to the matrix X.

The algorithm for quantile normalization described above is shown in FIG. 11, for purposes of illustration, using a specific example. In this case, the measured values are represented, by way of example, by natural numbers.

Figure 11:
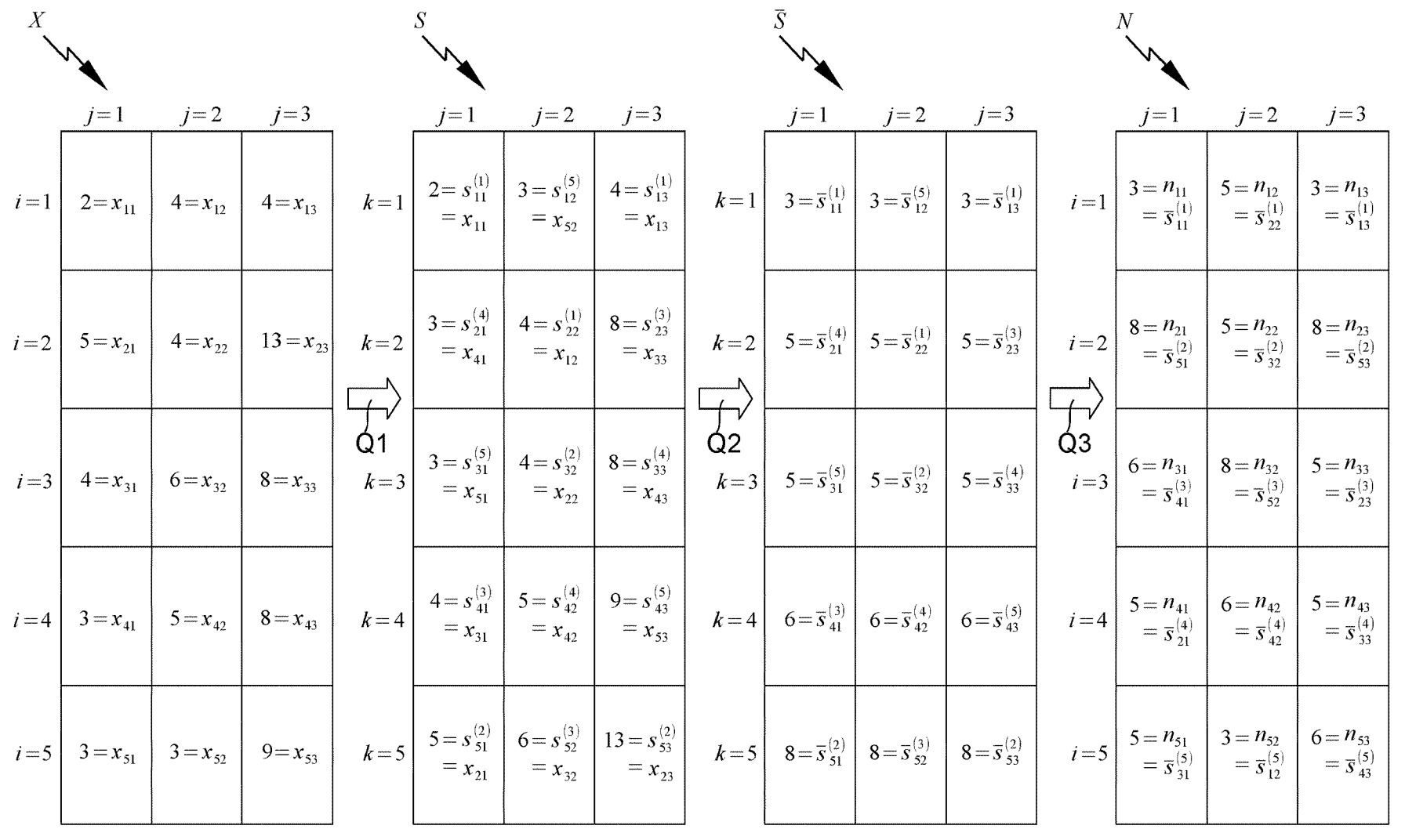

The matrix X having measured values $x_{ij}$, symbolized by specific number values in the figure, for example, $x_{11}=2$, $x_{32}=6$, etc., is shown on the left-hand side in FIG. 11.

In step Q1, the measured values or matrix elements are sorted by columns, in an ascending manner in the example shown, and the matrix S is thus formed. Sorting in a descending manner would, in this case, yield the same result or the same normalized measured values. In the case of the ascending sorting, the first row of the matrix S contains the smallest measured values of each measurement, the second row contains the second-smallest measured values of each measurement, etc.

The sorting will be explained in the following with reference to the example of the first column in FIG. 11. The procedure for the second and third column is analogous.

The smallest value in the first column of the matrix X is the matrix element $x_{11}=2$. Therefore, this value remains in the matrix S as the matrix element $s_{11}^{(1)}$ in the first row. The superscript index specifies that this value was in the first row in the matrix X.

The next-largest value in the first column of the matrix X is the value 3, which, however, appears twice, specifically in the fourth and fifth rows. Consequently, these values are entered in the second and third rows of the matrix S where they form the matrix elements) $s_{21}^{(4)}$ and $s_{31}^{(5)}$. The superscript indices (4) and (5) specify that these values were in the fourth and fifth rows, respectively, in the matrix X. When values are the same, the order of the sorting is irrelevant. Accordingly, in the example, inverted sorting into the matrix S as $s_{21}^{(5)}$ and $s_{31}^{(4)}$ would also be possible. This yields the same result in the normalization.

The next largest matrix element in the first column of the matrix X is the matrix element $x_{31}=4$. Consequently, the matrix element is shifted, as matrix element $s_{41}^{(3)}$, into the fourth row of the first column of the matrix S. The superscript index (3) specifies that this value was in the third row in the matrix X.

The matrix element $x_{21}=5$ has the highest value in the first column and is therefore shifted into the last or fifth row of the first column in the matrix S, where it therefore forms the matrix element $s_{51}^{(2)}$. The superscript index (2) specifies that this value was in the second row in the matrix X.

The procedure is analogous for the further columns, and therefore all the columns are sorted in the same manner, for example, in an ascending or descending manner, in the matrix S.

In step Q2, the matrix elements of a row of the matrix S are each replaced by the average value or mean of all the matrix elements of the respective row, and thus the matrix $\bar{S}$ is formed. For example, an average value or mean of $$\frac{2+3+4}{3} = 3$$

results for the first row, an average value or mean of $$\frac{3+4+8}{3} = 5$$

for the second row, etc.

The matrix elements of the matrix S are already the normalized measured values, but, in the matrix $\bar{S}$, are still arranged in an "incorrect" order or in a different order from the matrix X. In particular, the rows of the matrix S each contain measured values of different analytes A, whereas the rows of the matrix X each contain only the measured values of one analyte A.

Therefore, in the optional step Q3, the "original" order or arrangement of the measured values in the matrix can be re-established. In the example shown, this is achieved in that the matrix elements of the matrix $\bar{S}$ within a column are each shifted again into the row corresponding to the superscript index (i), and thus the matrix N is formed. With reference to the example of the first column of the matrix $\bar{S}$, the matrix element $s_{ij}=3$ therefore remains in the first row and forms the matrix element $n_{11}=3$. The matrix element $s_{21}=5$ is shifted into the fourth row and forms the matrix element $n_{41}=5$. The matrix element $\bar{s}_{31}^{(4)}=5$ is shifted into the fifth row and forms the matrix element $n_{51}=5$. The matrix element $\bar{s}_{41}^{(3)}=6$ is shifted into the third row and forms the matrix element $n_{31}=6$. The matrix element $\bar{s}_{51}^{(2)}=8$ is shifted into the second row and forms the matrix element $n_{21}=8$. The procedure for the further columns is analogous.

Different variants or options or embodiments for normalizing the measurement results 713, in particular of different analytes A, will be described in the following. The quantile normalization explained in detail above is preferably used for the normalization. In principle, however, the aspects explained in the following can also be implemented in any other desired normalization methods or normalization algorithms.

Preferably, in the following, different analytes A are denoted by or shortened to A1, A2, A3, ..., AN, different sensor fields 113B of the same sensor apparatus 113 or cartridge 100 are denoted by or shortened to SF1, SF2, SF3, ..., SFM, and different cartridges 100 are denoted by or shortened to C1, C2, C3, ..., CL. Accordingly, the reference sign SF is also used for a sensor field 113B, and the reference sign C is also used for a cartridge 100. N denotes the total number of different analytes A; M denotes the total number of the sensor fields 113B of a sensor apparatus 113 or cartridge 100; and L denotes the total number of the cartridges 100 that are involved or used in the normalization. The total numbers N, L and M are preferably each different ($N \neq M \neq L$).

In a first embodiment, the measurement results 713 of different analytes A are normalized preferably independently of one another. This means in particular that, in order to normalize the measurement results 713 of an analyte A, exclusively measured values of the same analyte A, or no measured values of other analytes A, are used. In particular, only measured values of the same analyte A are assigned to a group.

The structure of the matrix X in the first embodiment is shown in FIG. 12A. Preferably, in the first embodiment, a (separate or analyte A-assigned) matrix X is formed or created for each analyte A. In the first embodiment, the matrix X preferably contains only measured values of the same analyte A as matrix elements. A row of the matrix X preferably contains measured values that were measured in the same or in mutually corresponding sensor fields SF of different cartridges C1-CL. A column of the matrix X preferably contains measured values that were measured in different sensor fields SF1-SFM of the same cartridge C. Preferably, the measured value measured in the ith sensor field SF of the jth cartridge C forms the matrix element $x_{ij}$. The matrix X has the dimension M×L.

In a second embodiment, the measurement results 713 of different analytes A are preferably normalized together, or, in order to normalize the measurement results 713 of an analyte A, measured values of another analyte A are used in addition. In particular, measured values of different analytes A are assigned to a group.

Figure 12B:
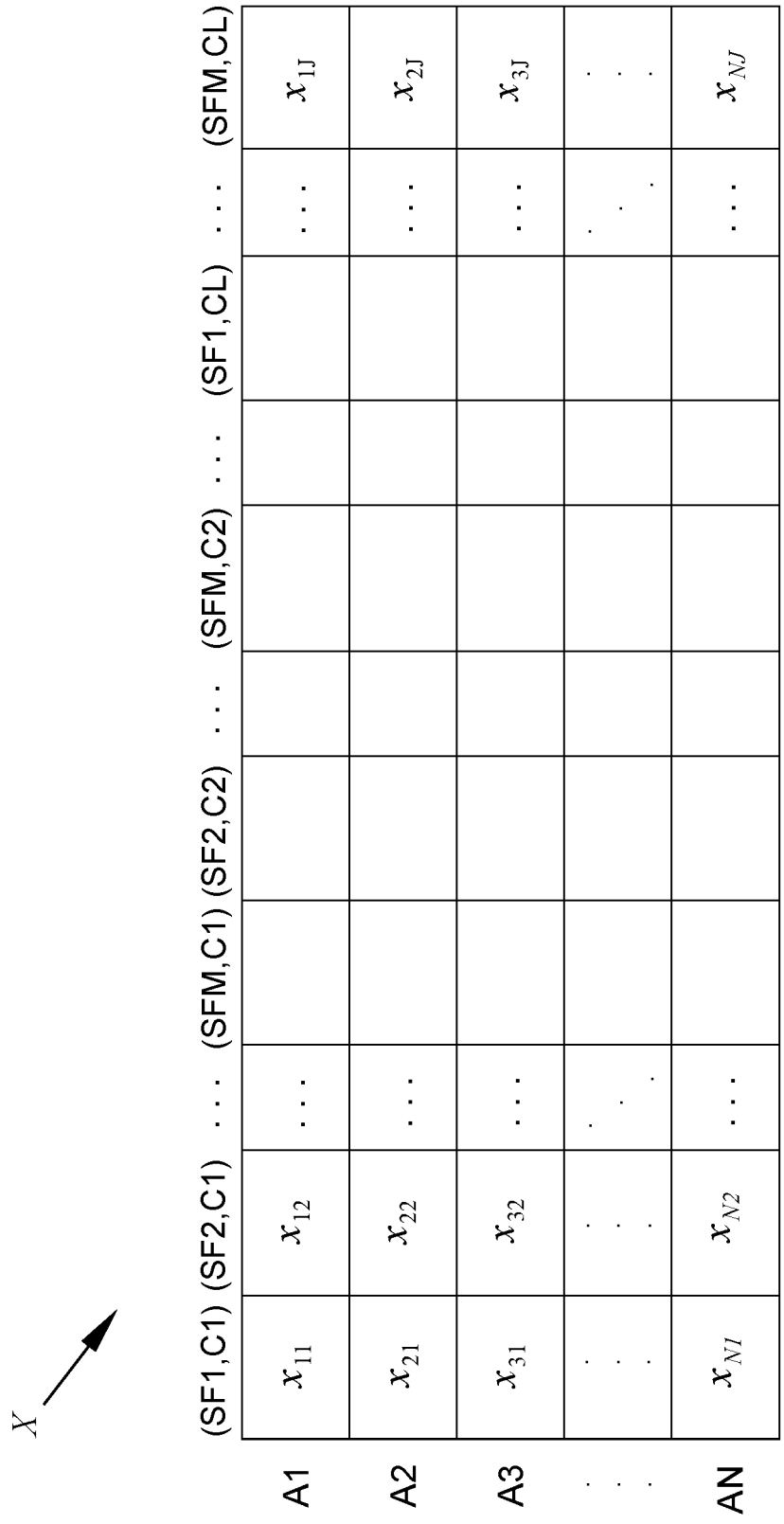

The structure of the matrix X in the second embodiment is shown in FIG. 12B. In the second embodiment, the matrix X preferably contains measured values of different analytes A1-AN as matrix elements. A row of the matrix X preferably contains different measured values of the same analyte A that were measured in (different) sensor fields SF1-SFM of different cartridges C1-CL. A column of the matrix X preferably contains measured values of different analytes A1-AN that were measured in the same sensor field SF of the same cartridge C. Each column preferably corresponds to or represents precisely one sensor field SF of precisely one cartridge C, or a sensor field-cartridge pair (SF, C). The order of the columns is arbitrary and may be different from that shown in FIG. 10B. The measured value of the ith analyte A1, measured in the jth sensor field or sensor field-cartridge pair (SF, C) preferably forms the matrix element $x_{ij}$, j being a superindex that enumerates the sensor fields SF of the different cartridges C or the sensor field-cartridge pairs (SF, C). The matrix X has the dimension N×J, where J=ML.

In a third embodiment, as for the second embodiment, the measurement results 713 of different analytes A are preferably normalized together, or, in order to normalize the measurement results 713 of an analyte A, measured values of another analyte A are used in addition. In particular, measured values of different analytes A are assigned to a group.

The structure of the matrix X in the third embodiment differs from that of the second embodiment and is shown in FIG. 12C. In the third embodiment, the matrix X preferably contains measured values of different analytes A1-AN as matrix elements. A row of the matrix X preferably contains measured values of the same analyte A that were measured in the same or in mutually corresponding sensor fields SF of different cartridges C1-CL, or represents an analyte-sensor field pair (A, SF). A column of the matrix X preferably contains measured values of different analytes A1-AN that were measured in different sensor fields SF1-SFM of the same cartridge C. The order of the rows is arbitrary and may be different from that shown in FIG. 12C. Each column corresponds to or represents a cartridge C. The measured value of the ith analyte-sensor field pair (A, SF) measured in the jth cartridge C preferably forms the matrix element $x_{ij}$, i being a superindex that enumerates the analyte-sensor field pairs (A, SF). The matrix X has the dimension J×L, where J=NM.

Alternatively, or in addition to the three embodiments described hitherto, the measurement results 713 and/or reference results 714 and/or measured values may be combined prior to normalization to form a total value GW, for example, by means of summation, averaging or the like.

In particular, the separate measurement results 713 of one analyte A are combined to form a total value GW. Preferably, the total value GW of an analyte A is formed by the sum or the average value or mean of the measurement results 713 or reference results 714 of a plurality of or all the sensor fields 113B of one cartridge 100.

In particular, a plurality of total values GW can be formed for one cartridge 100. If the cartridge 100 comprises n sensor fields 113B in which the same analyte A is measured, and in each case m separate measurement results 713 are combined to form a total value GW, $$\frac{n}{m}$$

total values GW are formed for the cartridge 100 and/or for the analyte A to be determined.

The total value GW is preferably formed in the same manner for each cartridge 100 of which the measured values are taken into account in the normalization. For example, for each cartridge 100 the measured values of all the sensor fields 113B could be added together to form a total value GW, or, for each cartridge 100 the measured values of, for example, 10, 100 or 1000 sensor fields 113B are, respectively, combined to form a total value GW which is formed by the average value or mean of the measured values.

Total values GW of different analytes A can be normalized independently of one another or together with the total values GW of other analytes A.

Figure 12D:
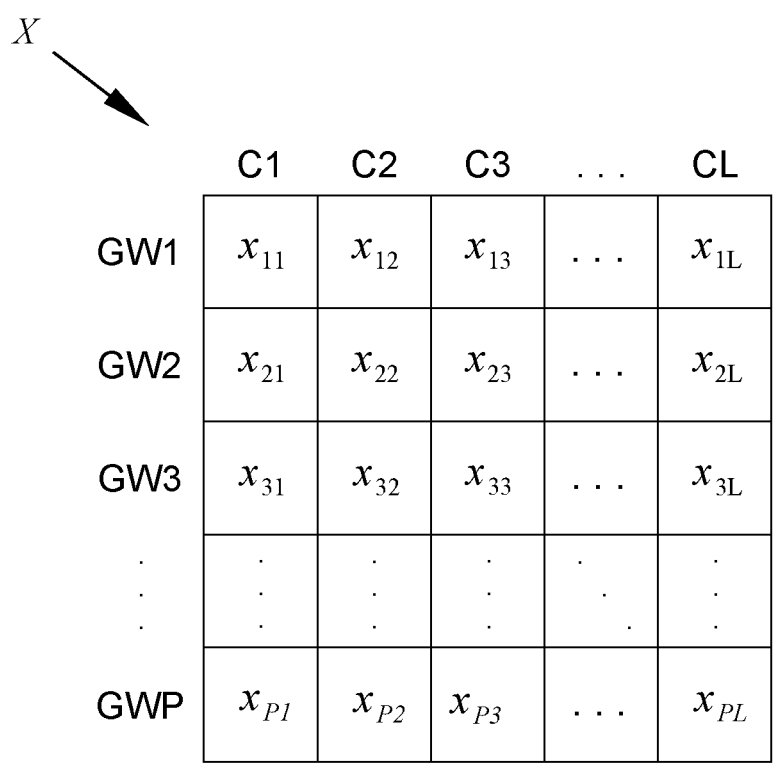
Figure 12E:
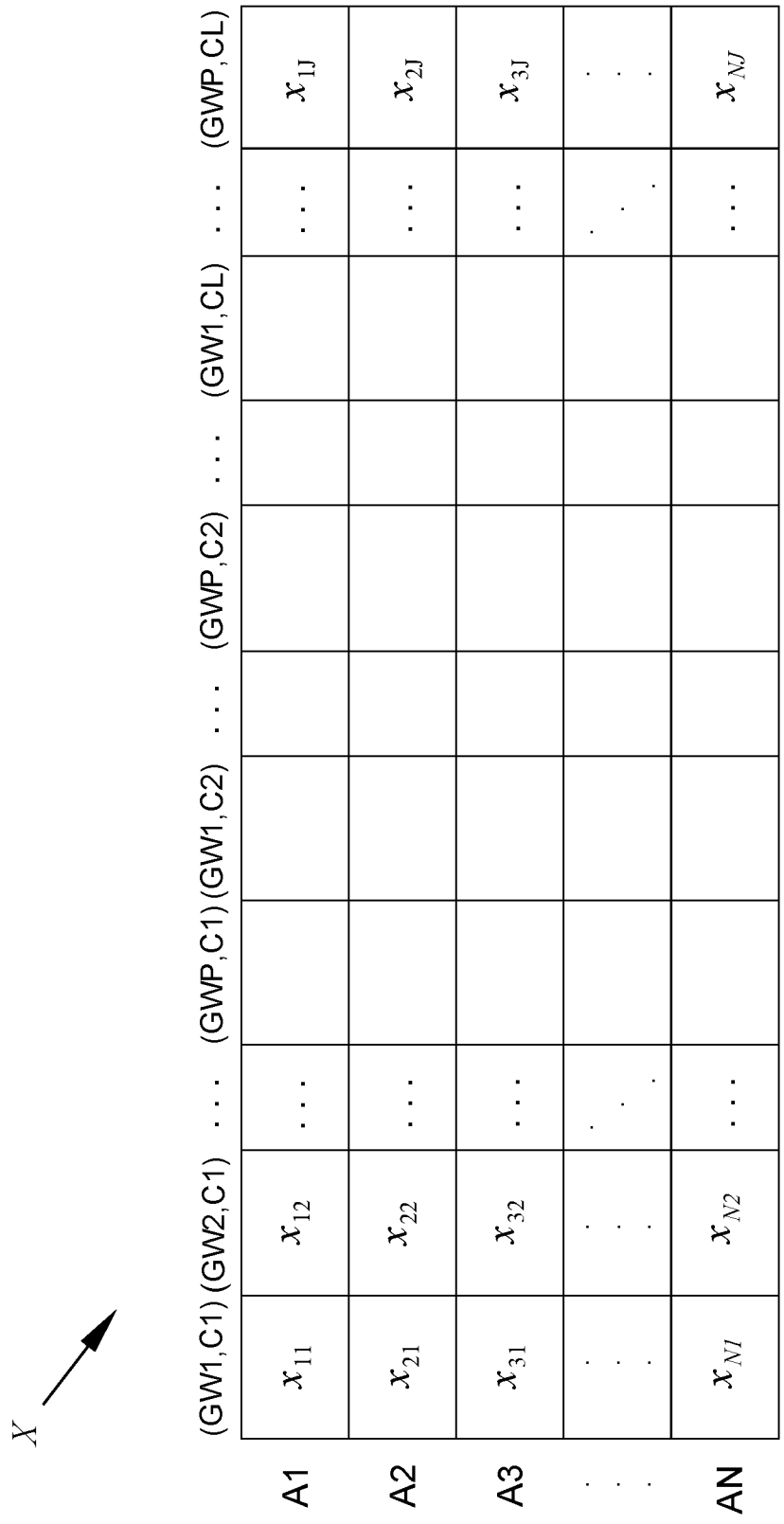
Figure 12F:
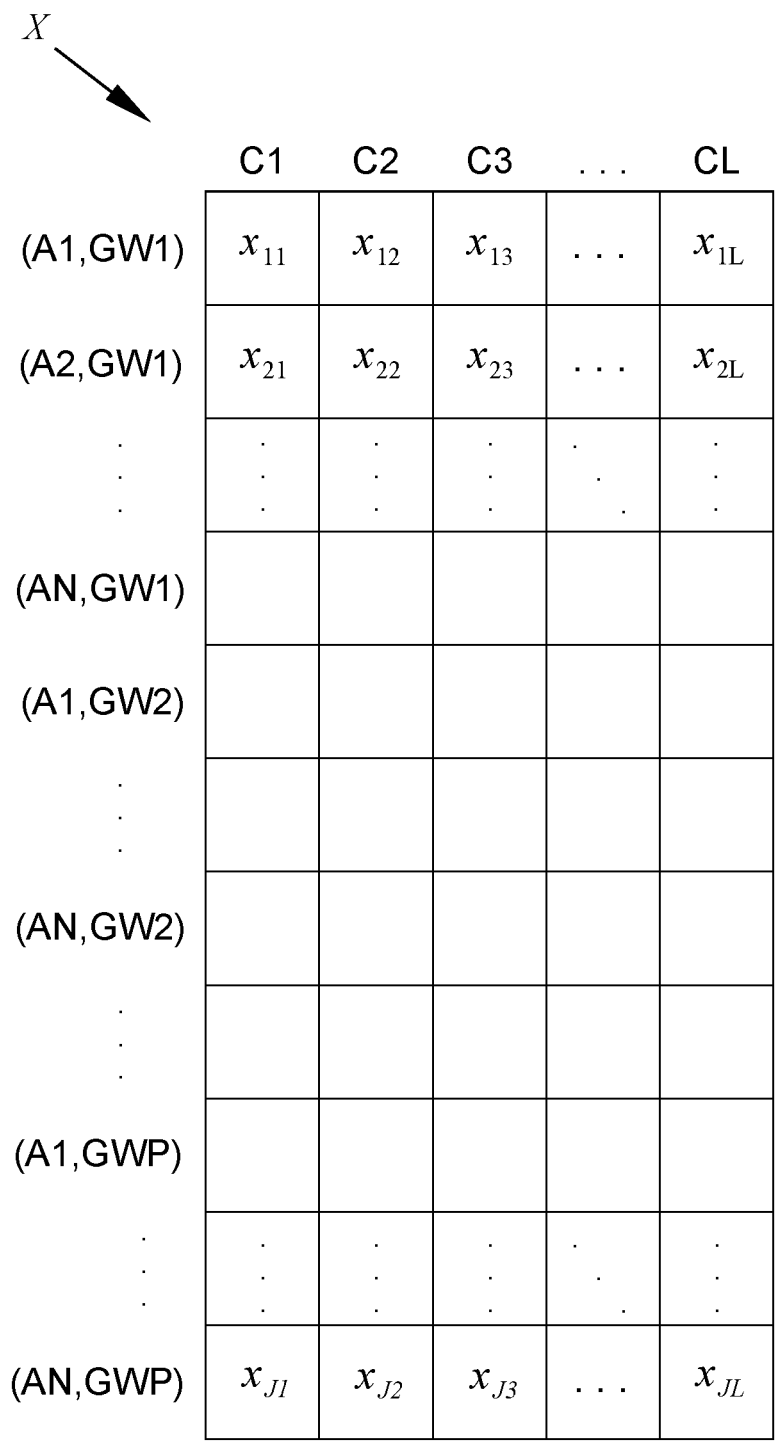

FIG. 12D to 12F show a fourth, fifth and sixth embodiment in which one or more total values GW1-GWP of the analyte A are formed, respectively, P being the total number of the total values GW formed.

In a fourth embodiment, the measurement results 713 of different analytes A are normalized preferably independently of one another, separate measurement results 713 of the same analyte A being combined (prior to normalization) to form one or more total values GW of the analyte A, and/or the total values GW being normalized. This means in particular that, in order to normalize the measurement results 713 of an analyte A, exclusively measured values or total values GW of the same analyte A, or no measured values or total values GW of other analytes A, are used. In particular, only measured values or total values GW of the same analyte A are assigned to a group.

The fourth embodiment is preferably at least substantially identical to the first embodiment, but the measured values are combined to form total values GW prior to normalization.

The structure of the matrix X in the fourth embodiment is shown in FIG. 12D. Preferably, in the fourth embodiment, a (separate or analyte A-assigned) matrix X is formed or created for each analyte A. In the fourth embodiment, the matrix X preferably contains only total values GW of the same analyte A as matrix elements. A row of the matrix X preferably contains mutually corresponding total values GW of different cartridges C1-CL. "Mutually corresponding total values GW of different cartridges C1-CL" are in particular total values GW that were formed form measured values that were measured in the same or in mutually corresponding sensor fields SF of different cartridges C1-CL. A column of the matrix X preferably contains different total values GW1-GWP of the same cartridge C. The matrix X has the dimension P×L.

In a fifth embodiment, the measurement results 713 of different analytes A are preferably normalized together, or, in order to normalize the measurement results 713 of an analyte A, measured values of another analyte A are used in addition, the measurement results 713 or measured values being combined (prior to normalization) to form total values GW, and/or the total values GW being normalized. In particular, measured values or total values GW of different analytes A are assigned to a group.

The fifth embodiment is preferably at least substantially identical to the second embodiment, but the measured values are combined to form total values GW prior to normalization.

The structure of the matrix X in the fifth embodiment is shown in FIG. 12E. In the fifth embodiment, the matrix X preferably contains total values GW1-GWP of different analytes A1-AN as matrix elements. A row of the matrix X preferably contains different total values GW1-GWP of the same analyte A that were formed of measured values measured in (different) sensor fields SF1-SFM of different cartridges C1-CL. A column of the matrix X preferably contains total values GW of different analytes A1-AN that were formed of measured values measured in the same cartridge C. Each column preferably corresponds to or represents precisely one total value GW of precisely one cartridge C, or a total value-cartridge pair (GW, C). The order of the columns is arbitrary and may be different from that shown in FIG. 12E. Preferably, the jth total value-cartridge pair (GW, C) of the ith analyte A forms the matrix element $x_{ij}$, j being a superindex that enumerates the total value-cartridge pairs (GW, C). The matrix X has the dimension N×J, where J=PL.

In a sixth embodiment, as for the fifth embodiment, the measurement results 713 of different analytes A are preferably normalized together, or, in order to normalize the measurement results 713 of an analyte A, measured values of another analyte A are used in addition, the measurement results 713 or measured values being combined (prior to normalization) to form total values GW, and/or the total values GW being normalized. In particular, measured values or total values of different analytes A are assigned to a group.

The sixth embodiment is preferably at least substantially identical to the third embodiment, but the measured values are combined to form total values GW prior to normalization.

The structure of the matrix X in the sixth embodiment differs from that of the fifth embodiment and is shown in FIG. 12F. In the sixth embodiment, the matrix X preferably contains total values GW1-GWP of different analytes A1-AN as matrix elements. A row of the matrix X preferably contains mutually corresponding total values GW of the same analyte A that were formed of measured values measured in the same or mutually corresponding sensor fields SF of different cartridges C1-CL. A row of the matrix X preferably represents an analyte-total value pair (A, GW). A column of the matrix X preferably contains different total values GW1-GWP of different analytes A1-AN that were formed of measured values measured in the same cartridge C. The order of the rows is arbitrary and may be different from that shown in FIG. 12F. Each column corresponds to or represents a cartridge C. Preferably, the ith analyte-total value pair (A, GW) of the j th cartridge C forms the matrix element $x_{ij}$, i being a superindex that enumerates the analyte-total value pairs (A, GW). The matrix X has the dimension J×L, where J=NP.

The analysis system 1 is preferably designed to perform the method described above, in particular the normalization, or comprises one or more means that are suitable for carrying out the steps of the method. In particular, the means for carrying out the method are formed by a computer program or a computer program product, in particular an app for a smartphone.

Preferably, the operating instrument 400 is designed as a smartphone and/or the operating instrument 400 comprises the evaluation module, in particular a computer program or an app for performing the method and/or the normalization.

In particular, for this purpose or in this case, the operating instrument 400 or the app communicates with the analysis device 200 and/or the database 500, as explained in detail above.

The normalized measured values or measurement results 713 preferably form the evaluation results 740 or at least a portion of the evaluation results 740.

The retrieval of calibration information 520 and/or reference results 714 preferably takes place immediately prior to or immediately following the measurement of the sample P or the measurement results 713. However, other solutions are also possible here. For example, in rural regions it may be advantageous for the determination of the analyte A or the evaluation of the measurement results 713 and/or the retrieval of the calibration information 520 and/or reference results 714 to take place only when or not until the operating instrument 400 is or can be connected to the database 500, in particular several hours prior to or following the measurement. Preferably, the evaluation is delayed, if the operating instrument 400 is not or cannot be connected to the database 500 during the measurement, until a connection to the database 500 can be or is established.

Individual aspects and features of the present invention, as well as individual method steps and/or method variants may also be implemented independently from one another, but also in any desired combination and/or order.

LIST OF REFERENCE SIGNS 1 analysis system
100 cartridge
100C cartridge identifier
100D memory means
101 main body
102 cover
103 fluid system
104 receiving cavity
104A connection
104B inlet
104C outlet
104D intermediate connection
105 metering cavity
105A first metering cavity
105B second metering cavity
106(A-G) intermediate cavity
107 mixing cavity
108(A-E) storage cavity
109A first reaction cavity
109B second reaction cavity
109C third reaction cavity
110 intermediate temperature-control cavity
111 collection cavity
112 pump apparatus
113 sensor apparatus
113A sensor array
113B sensor field
113C electrode
113D support
113E contact
113F layer
114 channel
114A bypass
115 valve
115A initially closed valve
115B initially open valve
116 sensor portion
117 sensor cover
118 sensor compartment
124 barcode
200 analysis device
200C device identifier
201 receptacle
202 pump drive
203 connection apparatus
203A contact element
204 temperature-control apparatus
204A reaction temperature-control apparatus
204B intermediate temperature-control apparatus
204C sensor temperature-control apparatus
205 (valve) actuator
205A (valve) actuator for 115A
205B (valve) actuator for 115B
206 sensor
206A fluid sensor
206B other sensor
207 control apparatus
207C read-out module
208 input apparatus
209 display apparatus
210 interface
210A receiver
210B transmitter
211 power supply
211A connection
212 housing
213 opening
400 operating instrument
400C operating instrument identifier
410 output apparatus
411 display
412 speaker
420 input apparatus
421 camera
422 touchpad
423 microphone
424 keyboard
430 interface
431 analysis device interface
432 database interface
440 evaluation module
450 memory
500 database
510 control information
520 calibration information
530 evaluation information
550 results memory
601 data transmission cartridge—analysis device
602 data transmission analysis device—operating instrument
603 data transmission operating instrument—database
604 data transmission database—operating instrument
605 data transmission operating instrument—analysis device
607 results retrieval cartridge—analysis device
608 data transmission analysis device—operating instrument
609 evaluation process
610 data transmission operating instrument—database
713 measurement result from the sensor apparatus
714 reference result
740 evaluation result
A(1-N) analyte
B1 step (measurement of sample)
B2 step (evaluation of measurement results)

B2.0 step (preparation of measurement results)
B2.1 step (normalization of measurement results)
B2.2 step (combination of measurement results)
B2.3 step (determination of second function)
B2.4 step (determination of point of intersection)
B3 step (output of evaluation result)
BP determination point
C(1-L) cartridge
CH batch
D detector molecule
DVA data connection analysis device—operating instrument
DVC data connection cartridge—analysis device
DVD data connection database—operating instrument
F(1-5) liquid reagent(s)
FN(1-2) capture nucleic acid sequence(s)
FP(1-2) capture protein(s)
GW(1-P) total value
I1 first function
I2 second function
K(1-10) concentration (of the analyte)
L label
M capture molecule
N network
P sample
Q1 first step (quantile normalization)
Q2 second step (quantile normalization)
Q3 third step (quantile normalization)
R1 step (reference measurement)
R2 step (evaluation of reference results)
R2.0 step (preparation of reference results)
R2.1 step (normalization of reference results)
R2.2 step (combination of reference results)
R2.3 step (determination of first function)
RP reference point
S(1-8) dry reagent
SA first substance
SP second substance
SU substrate
SF(1-M) sensor field
amplification product
Z point of intersection
ZN(1-2) target nucleic acid sequence
ZP(1-2) target protein

What is claimed is:

1. A method for determining at least one analyte of an unknown biological sample, comprising:
    selecting a cartridge from a known batch of a plurality of similar cartridges which were produced in a batch process,
    inserting the selected cartridge in an analysis device,
    measuring the sample using the cartridge selected from the batch of a plurality of similar cartridges which were produced in a batch process,
    sending measurement results from said measuring of the sample to an evaluation unit, and
    using the evaluation unit for evaluating the measurement results to determine the analyte,
    wherein reference results are used by the evaluation unit to evaluate the measurement results, the reference results being results of previous, separate measurements of reference samples performed using a plurality of different cartridges of the same batch of cartridges from which the cartridge used to measure the sample was obtained,
    wherein the measurement results are normalized several times by the evaluation unit using different reference results during producing of evaluation results, and
    using an output apparatus to output the evaluation results.

2. The method according to claim 1, wherein the reference results are normalized or normalized reference results are used for the evaluation.

3. The method according to claim 1, wherein the reference results are normalized separately from the measurement results.

4. The method according to claim 1, wherein the reference results are combined to form a plurality of reference points.

5. The method according to claim 4, wherein the reference points have two coordinates, wherein a first coordinate is frequency or concentration of the analyte in the respective reference sample and a second coordinate is an average value of the reference results of the reference sample.

6. The method according to claim 4, wherein the measurement results are normalized separately using the reference results of each family of reference measurements or cartridges, on the basis of which a reference point was generated.

7. The method according to claim 1, wherein a first function is formed on the basis of the reference results.

8. The method according to claim 7, wherein the first function represents a relationship between a frequency or concentration of the analyte and a measurement result of the analyte that is representative for the batch.

9. The method according to claim 7, wherein the first function represents, at least approximately, a progression of reference points as a function of frequency or concentration in the reference samples.

10. The method according to claim 7, wherein the first function is a linear function.

11. The method according to claim 7, wherein a second function is formed on the basis of the measurement results.

12. The method according to claim 11, wherein the second function is a linear function.

13. The method according to claim 11, wherein the analyte is determined from a comparison of the measurement results or the second function with the first function.

14. The method according to claim 13, wherein a point of intersection of the second function with the first function is determined.

15. The method according to claim 14, wherein the analyte is determined by means of the point of intersection.

16. The method according to claim 14, wherein the point of intersection (Z) represents the frequency or concentration of the analyte.

17. The method according to claim 11, wherein the first function is formed on the basis of normalized reference results.

18. The method according to claim 17, wherein the second function is formed on the basis of normalized measurement results or on the basis of normalized measurement results and reference results.

19. The method according to claim 1, wherein determination points are generated on the basis of the measurement results and the reference results.

20. The method according to claim 19, wherein the determination points have two coordinates, wherein a first coordinate is frequency or concentration of the analyte in each respective reference sample at which the reference results of the corresponding reference point were measured and wherein a second coordinate is a combination of the measurement results and reference results of the reference sample.

21. The method according to claim 1, wherein jointly normalized measurement results and reference results are each combined to form a determination point of the frequency or concentration at which the reference results were measured.

22. The method according to claim 21, wherein a second function is formed on the basis of the determination points or on the basis of the measurement results and reference results.

23. The method according to claim 22, wherein the second function represents, at least approximately, the progression of the determination points as a function of the frequency or concentration in the reference samples.

24. The method according to claim 1, wherein separate measurement results are obtained by measuring the same analyte in a plurality of sensor fields of a sensor apparatus of the cartridge, independently of one another and simultaneously.

25. The method according to claim 1, wherein the measurement results are normalized, wherein, in order to normalize the measurement results of an analyte, measurement results of another analyte are used in addition.

26. The method according to claim 1, wherein the measurement results are normalized, wherein, in order to normalize the measurement results of an analyte, reference results of another analyte are used in addition.

27. The method according to claim 1, wherein the measurement results of different analytes are normalized independently of one another.

28. The method according to claim 1, wherein the reference results and/or measurement results are normalized by means of quantile normalization.

29. The method according to claim 1, wherein the analyte is a protein, a nucleic acid or an aptamer.

30. The method according to claim 1, wherein the analytes or amplification products of the analytes are bonded to corresponding capture molecules of a sensor apparatus of the cartridge.

31. The method according to claim 30, wherein the analytes or amplification products that are bonded to the capture molecules are detected electrically or electrochemically.

32. Analysis system for determining at least one analyte of an unknown biological sample, comprising: a cartridge for receiving the sample, the cartridge being from a known batch of a plurality of similar cartridges which were produced in a batch process, and an analysis device for receiving the cartridge and for subsequently determining the analyte with the received cartridge, and wherein the cartridge has sensors for measuring the sample, and an evaluation unit adapted to receive measurement results from the cartridge and for evaluating the measurement results qualitatively and/or quantitatively to determine the analyte, wherein the evaluation unit is adapted to use the reference results to evaluate the measurement results, the reference results being results of previous, separate measurements of reference samples performed using a plurality of different cartridges of the same batch of cartridges from which the cartridge used to measure the sample was obtained, wherein the evaluation unit is adapted to normalize the measurement results several times using different reference results for producing of evaluation results, and further comprising output apparatus for outputting the evaluation results.

33. The analysis system according to claim 32, wherein the evaluation unit comprises an evaluation module.

34. The analysis system according to claim 33, further comprising an operating instrument that is separate or separable from the analysis device.

35. The analysis system according to claim 34, wherein the operating instrument comprises the evaluation module.

36. The analysis system according to claim 34, further comprising a program comprising commands for carrying out or controlling the measuring and evaluating.

* * * * *